(12) United States Patent
Vogelpohl

(10) Patent No.: US 11,338,626 B2
(45) Date of Patent: May 24, 2022

(54) DEVICES AND SYSTEMS FOR CONTROLLING TIRE PRESSURE

(71) Applicant: Peter Vogelpohl, Canton, GA (US)

(72) Inventor: Peter Vogelpohl, Canton, GA (US)

(*) Notice: Subject to any disclaimer, the term of this patent is extended or adjusted under 35 U.S.C. 154(b) by 111 days.

(21) Appl. No.: 16/675,411

(22) Filed: Nov. 6, 2019

(65) Prior Publication Data

US 2020/0139772 A1 May 7, 2020

Related U.S. Application Data

(60) Provisional application No. 62/756,399, filed on Nov. 6, 2018.

(51) Int. Cl.
| | |
|---|---|
| *B60C 23/04* | (2006.01) |
| *B60C 23/16* | (2006.01) |
| *B60C 23/10* | (2006.01) |
| *B60C 23/00* | (2006.01) |

(52) U.S. Cl.
CPC .... *B60C 23/0474* (2013.01); *B60C 23/00318* (2020.05); *B60C 23/00354* (2020.05); *B60C 23/00363* (2020.05); *B60C 23/00372* (2020.05); *B60C 23/10* (2013.01); *B60C 23/16* (2013.01)

(58) Field of Classification Search
CPC ..... B60C 23/0474; B60C 23/16; B60C 23/10; B60C 23/003; B60C 23/00363; B60C 23/00345

See application file for complete search history.

(56) References Cited

U.S. PATENT DOCUMENTS

| | | | |
|---|---|---|---|
| 8,125,323 B2 | 2/2012 | Stephan et al. | |
| 8,564,429 B2 | 10/2013 | Zhou | |
| 8,651,155 B2 | 2/2014 | Hinque et al. | |
| 9,796,224 B2 | 10/2017 | Lamgaday et al. | |
| 2008/0006357 A1* | 1/2008 | Wakabayashi | B60C 23/12 152/415 |
| 2011/0033313 A1* | 2/2011 | Gruber | F16K 17/0473 417/1 |
| 2019/0329602 A1* | 10/2019 | Pouls | B60C 23/003 |

FOREIGN PATENT DOCUMENTS

CN 200995595 Y 12/2007

* cited by examiner

*Primary Examiner* — Daryl C Pope
(74) *Attorney, Agent, or Firm* — Bekiares Eliezer LLP

(57) ABSTRACT

Disclosed herein are devices and systems for continuous control of tire pressure. In one aspect, a device for continuously controlling tire pressure includes a bracket, a fixed non-rotating member fixedly attached to the bracket, and a non-fixed rotating member rotatably attached thereto. The fixed non-rotating member has at least one first seal surface, the at least one seal surface configured to be in fluid communication with a compressed air source. The non-fixed rotating member has at least one second seal surface, wherein an air chamber defined within a volume between interacting the at least one first seal surface and the at least one second seal surface causes fluid communication between an interior space of the tire and the compressed air source.

19 Claims, 27 Drawing Sheets

DEVICES AND SYSTEMS FOR CONTROLLING TIRE PRESSURE

CROSS REFERENCE TO RELATED APPLICATIONS

This application claims the benefit of priority to U.S. Provisional Application No. 62/756,399, filed Nov. 6, 2018, which is hereby incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF INVENTION

The present invention relates to methods, devices, and systems for controlling tire pressure.

BACKGROUND OF THE INVENTION

Currently available Central Tire Inflation Systems (CTIS) are geared to defense, agricultural, and industrial sectors and comprise system components that are often integrated into the vehicle axle/hub system requiring major modifications at great expense for utilization. Current options for a bolt-on CTIS that requires little to no modifications to, and/or replacement of, the vehicle's axle and or suspension components are limited.

Accordingly, there remains a need for new tire inflation devices and systems which are bolt-on and can be installed/removed as easily as changing a tire. This need and other needs are satisfied by the various aspects of the present disclosure.

SUMMARY OF THE INVENTION

In accordance with the purposes of the invention, as embodied and broadly described herein, the invention, in one aspect, relates to device and systems for controlling tire pressure, such as in connection with a vehicle, for example, off-road vehicles.

In one aspect, the invention relates to an air wheel spacer device, or a device for continuously controlling tire pressure in a vehicle. The device for continuously controlling tire pressure includes a bracket configured to be fixedly attached to a mounting point on a vehicle, the mounting point associated with a tire of the vehicle, a fixed non-rotating member fixedly attached to the bracket, the fixed non-rotating member having at least one first seal surface, the at least one seal surface configured to be in fluid communication with a compressed air source, and a non-fixed rotating member rotatably attached to the fixed non-rotating member, the non-fixed rotating member being configured to rotate with the tire and having at least one second seal surface, wherein an air chamber defined within a volume between interacting the at least one first seal surface and the at least one second seal surface causes fluid communication between an interior space of the tire and the compressed air source.

In another aspect, the invention relates to a system for retrofitting a vehicle to have continuously controlled tire pressure. The system can include a controller configured to facilitate the control of tire pressure at a first tire associated with the vehicle; and a first device for continuously controlling tire pressure. The first device being controlled through the controller and comprising a fixed non-rotating member fixedly attached to the vehicle, the fixed non-rotating member having at least one first seal surface, the at least one seal surface configured to be in fluid communication with a compressed air source, and a non-fixed rotating member rotatably attached to the fixed non-rotating member, the non-fixed rotating member being configured to rotate with the tire and having at least one second seal surface, wherein an air chamber defined within a volume between interacting the at least one first seal surface and the at least one second seal surface causes fluid communication between an interior space of the tire and the compressed air source.

In another aspect, the invention relates to an air wheel spacer device, the air wheel spacer device comprising: (a) a hub assembly comprising: (i) a first (e.g., outer) plate or disk having a first edge defining a first circumference of a first portion of the first plate, a second recessed edge defining a second circumference of a second portion of the first plate, and an air channel having a first opening disposed on a surface of the first edge and a second opening disposed on a surface of the second edge, the air channel extending between the first and second openings; (ii) a second (inner) plate or disk having a first edge defining a first circumference of the second plate, the second plate being configured to couple to the first plate, and the coupled plates being configured to attach to and rotate with a wheel of a vehicle; and (iii) a (central) ring plate having a first (outer) edge defining a first circumference, a second (inner) edge defining a second circumference, and an air channel having a first opening disposed on a surface of the first edge and a second opening disposed on a surface of the second edge, the air channel extending between the first and second openings, the ring plate being configured to connect to a portion of the vehicle; wherein the coupled plates are configured to be in communication with the ring plate; and (b) a compressed or pressurized air source capable of producing pressurized air effective to maintain tire pressure at a predetermined level. As used herein, the terms "air spacer" or "air wheel spacer" means any disclosed device or apparatus comprising a hub assembly configured to connect to a rotating member of a vehicle, such as a wheel, and a stationary portion of the vehicle, such as a body, axle assembly, or other stationary assembly.

In another aspect, the invention relates to a system for controlling tire pressure, the system comprising: (a) at least one disclosed air wheel spacer device; and (b) one or more of: a compressed gas source, an air treatment system (ATS), a controller, an independent wheel module (IWM), an inner wheel valve (IWV), and a wireless device.

In various aspects, the invention can allow a vehicle operator to raise/lower individual tire pressures while driving the vehicle. In further aspects the invention can also monitor and maintain set tire pressures to ensure consistent pressures while driving, can alert the vehicle operator of a possible slow or fast leak in the tire, and can take actions to maintain a desired tire pressure.

In various further aspects, the invention requires little or no modifications to and/or replacement of the vehicle's axle and/or suspension components. In another aspect, the invention can allow a user, such as a vehicle operator, to adjust tire pressure through one or more of the air spacer device(s) attached to one or more vehicle wheels by using a wireless device running application software (an "app"). For example, the user may use the wireless device to inflate one or more of the tires at a low or first level, a medium or second level, or a high or third level.

In still further aspects, the invention also relates to methods for using the disclosed devices and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1:
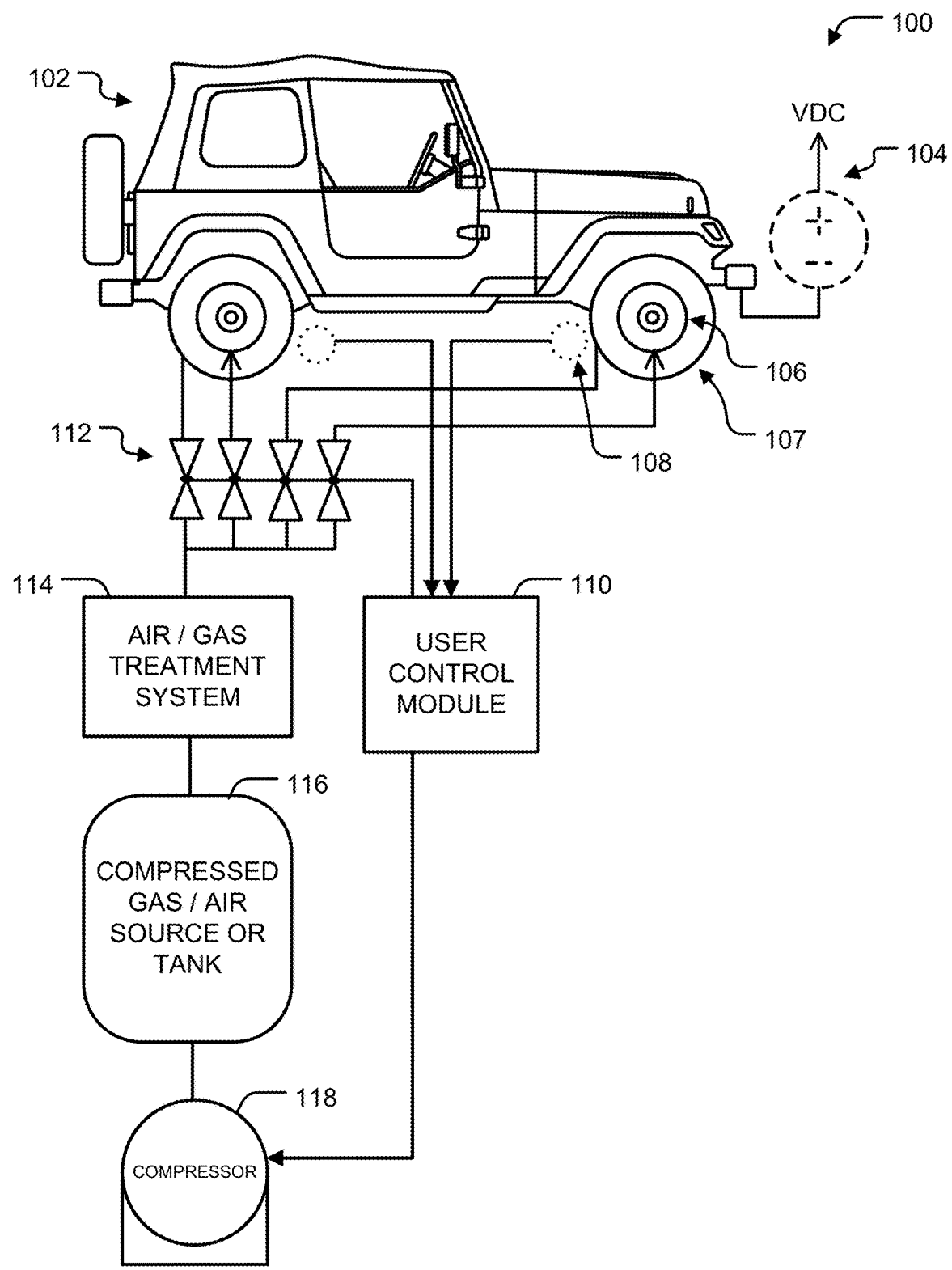
FIG. 1 is a diagram of a system or platform of controlling tire pressure, in accordance with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

As used herein, the terms "axial" and "axially," are used when referring to a dimension, direction, edge, and/or face relative to an imaginary line parallel to the vehicle axle and starting at the center of the axle. The terms "radial" and "radially," are used when referring to a dimension, direction, edge, and/or face relative to an imaginary line perpendicular to the axle and starting at the center of the axle shaft. The terms "inner," "inward," "outer," and "outward" references a dimension, direction, edge, and/or face of a component relative to a starting point. Other conventional terms for dimensions and directions may be used interchangeably herein.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Air Spacer Devices and Systems

As briefly described above, the present disclosure relates, in various aspects, to devices and systems for controlling tire pressure in a vehicle, such as a car, truck, or the like.

Systems disclosed herein include a Central Tire Inflation System (CTIS) for motorized vehicles and function to allow for the adjustment of pressure within the vehicle's tires. While some examples are particularly described with reference to off-road vehicles, exemplary embodiments are applicable to any variety of vehicle, including but not limited to, trucks, cars, buses, tractors, trailers, and any other vehicle having at least one wheel rotatably attached to a hub.

Generally, particular design specifications can be adapted and configured to fit most any vehicle. This disclosure also allows for the addition of CTIS to a vehicle without replacing and/or modifying the vehicle's axles. Additionally, systems disclosed herein may be removed from the vehicle, when not in use, as quickly as changing a tire.

Conventional CTIS systems require specialized axles and have limited vehicle applications. In contrast, as described herein, slight modifications can be adapted to fit most any vehicle while keeping the overall design the same. Furthermore, systems as disclosed herein can be installed, with the same ease, on both live and load axles.

A complete system may include one or more of the following components:
1. Air Wheel Spacer (AWS);
2. User Control Module (UCM);
3. On-Board Compressor (OBC);
4. Air Treatment System (ATS);
5. Distribution Valve Manifold (DVM); and
6. Wireless Pressure Sensors (WPS).

Generally, the Air Wheel Spacer is a device or assembly which allows for the transfer of tire pressure medium in either direction, between the rotating wheel/tire assembly and the vehicle chassis. There are other tire inflation systems available to consumers, but all suffer from drawbacks requiring either a fully stopped vehicle to function; or expensive modification to a vehicle's axles to use while moving. For example, full CTIS systems conventionally require replacement axles and/or major modifications to the vehicle. In contrast, the Air Wheel Spacer adds CTIS functionality without vehicle modification and it is possible that it could be incorporated into many of the other non-CTIS inflation systems to create a fully functioning CTIS. Thus, the operation of the Air Wheel Spacer, allowing for the movement of air between rotating wheel/tire assembly and non-rotating chassis, allows for the technical effects and benefits of retrofitting, easily, any vehicle to incorporate a Central Tire Inflation System. The retrofitting does not require expensive modifications to a vehicle, and therefore has the added benefit of reducing waste after install procedures.

In one aspect, the present disclosure provides a device for continuously controlling tire pressure. The device may be an air spacer wheel assembly having at least one fixed member, at least one rotating member, and an air channel disposed between the at least one fixed member and the at least one rotating member. The air channel extended into a tire allowing for control of pressure therein. The rotating member is configured to rotate relative to the fixed member about a single axis. At least one surface between the rotating member and the fixed member provides for an air-tight seal, even during rotation, such that tire pressure may be accurately and safely controlled.

In one aspect, the fixed member is a ring having one or more seal grooves, bearing pockets, guide bearings, and a portion of the air channel. The rotating member is configured to seat against the guide bearings and the seal grooves, and to rotate in relation to the fixed member. Generally, due to a tire being mounted about the rotating member, about the same hub axis of the vehicle, a tire valve may allow a severable air connection between a fixed point on a vehicle and an interior wall of a tire rim/hub.

In one aspect, a system for continuous tire pressure control includes the hub assembly as described above, and further includes a user control module configured to provide a graphical user interface related to tire pressure control. The user control module may further allow precise tuning of tire pressure attributes for a vehicle. The system can also includes an on-board compressor and/or compressed air source, an air treatment system configured to treat compressed air prior to injection into a tire, a distribution manifold configured to control tire pressure at one or more tires, and one or more wireless pressure sensors configured to provide feedback related to tire pressure control.

In another aspect, the present disclosure provides a second embodiment including a device for continuously controlling tire pressure. The (air spacer) device can include (a) a hub assembly comprising: (i) a first (e.g., outer) plate or disk having a first edge defining a first circumference of a first portion of the first plate, a second recessed edge defining a second circumference of a second portion of the first plate, and an air channel having a first opening disposed on a surface of the first edge and a second opening disposed on a surface of the second edge, the air channel extending between the first and second openings; (ii) a second (inner) plate or disk having a first edge defining a first circumference of the second plate, the second plate being configured to couple to the first plate, and the coupled plates being configured to attach to and rotate with a wheel of a vehicle; and (iii) a (central) ring plate having a first (outer) edge defining a first circumference, a second (inner) edge defining a second circumference, and an air channel having a first opening disposed on a surface of the first edge and a second opening disposed on a surface of the second edge, the air channel extending between the first and second openings, the ring plate being configured to connect to a portion of the vehicle; wherein the coupled plates are configured to be in communication with the ring plate; and (b) a compressed or pressurized air source capable of producing pressurized air effective to maintain tire pressure at a predetermined level. As used herein, the terms "air spacer" or "air wheel spacer" means any disclosed device or apparatus comprising a hub assembly configured to connect to a vehicle wheel and a portion of the vehicle body.

In another aspect, the present disclosure provides a system for continuously controlling tire pressure, the system comprising (a) at least one disclosed air spacer device; and (b) one or more of: an air treatment system (ATS), a controller, an independent wheel module (IWM), an inner wheel valve (IWV), and a wireless device.

Consistent with embodiments of the present disclosure, the invention can be described as including one or more air spacer devices. For example, if the invention is used in connection with an automobile, generally, each of the wheels will have an air spacer device, but not necessarily so. In further aspects, some embodiments of the invention, however, may provide one pair of the wheels with a first type of an air spacer device, while the other of the pair of wheels have different air spacer devices. For example, a user may have a system according to an embodiment of the invention with one or more robust, powerful air spacer devices, and differently sized air spacer devices positioned at different location.

In further aspects, the invention includes one or more air spacer devices in a system. In still further aspects, each system may comprise a plurality of air spacer devices. In yet further aspects, the air spacer device is configured to deliver pressurized air upon activation. As detailed herein, the air spacer device may be configured to sit between the rim and brake rotor of a vehicle.

According to various aspects of the invention, the devices and systems of the present disclosure can comprise multiple configurations. An initial configuration is presented firstly, without prejudice, with related FIGS. 2-15. A second configuration is presently secondly, without prejudice, with related FIGS. 16-26. It is noted that FIG. 1 depicts an exemplary system 100 and is generic to some implementations of individual air spacer hub assemblies and devices. The order of presentation does not represent any preference to components.

FIGS. 1-15 depict an exemplary air spacer hub assembly and system used in various embodiments of the disclosed devices and systems. Turning to the figures, FIG. 1 is a diagram of a system 100 or platform of controlling tire pressure, in accordance with an exemplary embodiment of the present invention. In some aspects, the system 100 may be referred to as a system for retrofitting a vehicle 102 to have continuously controlled tire pressure.

The system 100 includes a vehicle 102. Generally, any applicable vehicle having any number of axles may be used to practice features of this disclosure. Accordingly, the particular form of vehicle 102 illustrated is non-limiting. The system 100 includes air spacer hub assemblies 106 mounted with relation to respective tires 107 of the vehicle.

Each air spacer hub assembly comprises at least: a fixed, non-rotating member and a non-fixed, rotating member. A sealing arrangement between the fixed and non-fixed members defines at least a portion of an air channel configured to direct compressed air into the interior of a vehicle tire.

Generally, the system 100 may be energized or powered with a voltage source 104 available to the vehicle. Other voltage sources including batteries, storage devices, and/or generator/alternators may be applicable.

The system 100 further includes a user control module 110 configured to execute operations directed to the control of tire pressure of the vehicle 102. The user control module 110 may be configured to display a user interface in some implementations. According to at least one implementation, the user control module 110 may be operative to communicate with a user device (e.g., tablet or mobile phone) over a network. The user control module 110 may then present tire pressure information for display through the user device. The user control module 110 may also be configured to receive user commands from the user device (e.g., through a secure connection) and apply said commands to a method or routine for controlling tire pressure.

The user control module 110 may present the user interface and displays, in real time, desired tire pressure, actual tire pressure, and/or supply pressure. The user control module 110 may include user controls for power, setting desired pressure, activating/canceling current tasks, and presets. A large portion or most system functions can be controlled from the user control module 110. The user control module 110 may also house needed circuitry to receive pressure signals and send commands to system components. The user control module 110 may also function to give task status and system alerts for various conditions. The user control module 110, depending on features, can communicate with system components wired or wirelessly. Smartphone apps may also be developed for wireless control giving the user the option of a user control module 110 without display that may installed in a hidden location. Apps may also be developed for use with proprietary products, and various aftermarket automotive display/head unit/radio manufacturers.

The system 100 may also include individual tire pressure monitors 108, each associated with an individual tire and configured to communicate tire pressure status to the user control module 110. The system 100 further includes on board compressor 118, optional compressed air tank 116, air/gas treatment system 114, and distribution valve manifold 112.

The On-Board Compressor (OBC) 118 may include any suitable air/gas compressor. An on-board source of compressed air (or other medium) is generally needed to inflate tires. However, the OBC 118 is not necessary to deflate tires. The OBC 118 may be a consumer supplied component or may be configured for a particular vehicle. Some OBC systems have their own pressure switch or regulators integrated thereon to turn the compressors on and off as needed. For example, some compressors may work to maintain a window of pressure at the tank 116. Still others are configured to work to maintain close to maximum air pressure.

The Air Treatment System (ATS) 114 may be configured to condition or filter compressed air prior to distribution through the distribution valve manifold 112. The compressed air from OBC 118 must be routed through an air treatment system to protect system components. An oil/water separator and filter can be used first, and subsequently a pressure regulator/filter. The AWS 114 and related components are designed with a maximum allowable pressure. That specific pressure will vary based on application and system components can be designed based on the application.

The Distribution Valve Manifold (DVM) 112 is configured to individually distribute compressed air to each tire/wheel. A connection is made from the ATS 114 to the DVM 112. The compressed air supply is routed through the manifold to an individual solenoid valve for each AWS. Hoses from each AWS are individually connected to each valve. Valves can be 3-way valves, can be normally closed, and are electrically controlled by the UCM 110. The valve is the point where either additional pressure is supplied to each AWS 106 and wheel/tire OR pressure is released from each AWS 106 and wheel/tire assembly. Valve exhaust ports are combined in the manifold to give one large exhaust port while all supply ports remain individual. The entire assembly can be rated minimum IP55 or kept within a like-rated housing to protect from elements.

The Wireless Pressure Sensors (WPS) 108 are battery operated wireless sensors that attach at each wheel/tire valve stem. A sensor attaches at each wheel's valve stem. A signal from a sensor 108 is received within UCM 110 for tire pressure control. It is noted that other power sources such as solar, mechanical, and electrical may be used to supply power to each WPS 108 in some implementations, rather than batteries.

It is noted that although not particularly illustrated, various electrical wiring, components, hoses, and/or fittings may be needed to finalize a retrofit of the system 100 onto vehicle 102.

The system 100, for example, may require wiring and connections to/from various electrical components to provide power and control of the system. Pressure rated hoses/tubing can be used to interconnect from DVM 112 to each AWS 106. Similarly, pressure rated tubing may be used from each AWS 106 to an associated wheel/tire assembly 107.

While all portions of the system 100 may include the same or similar connections, the lengths and configurations will vary based on a particular vehicle application. A lead hose (from AWS 106 to wheel/tire 107) will attach to non-fixed rotating member 202 at one end and to the vehicle's wheel/tire assembly 107 at the other end. The lead hose may be rigid from the connection point at non-fixed rotating member 202 and formed to avoid contact with any vehicle parts and keep in close proximity of wheel 107. The other end will be flexible to allow for easy attachment and removal from the wheel 107 or any component of the wheel assembly.

Figure 2:
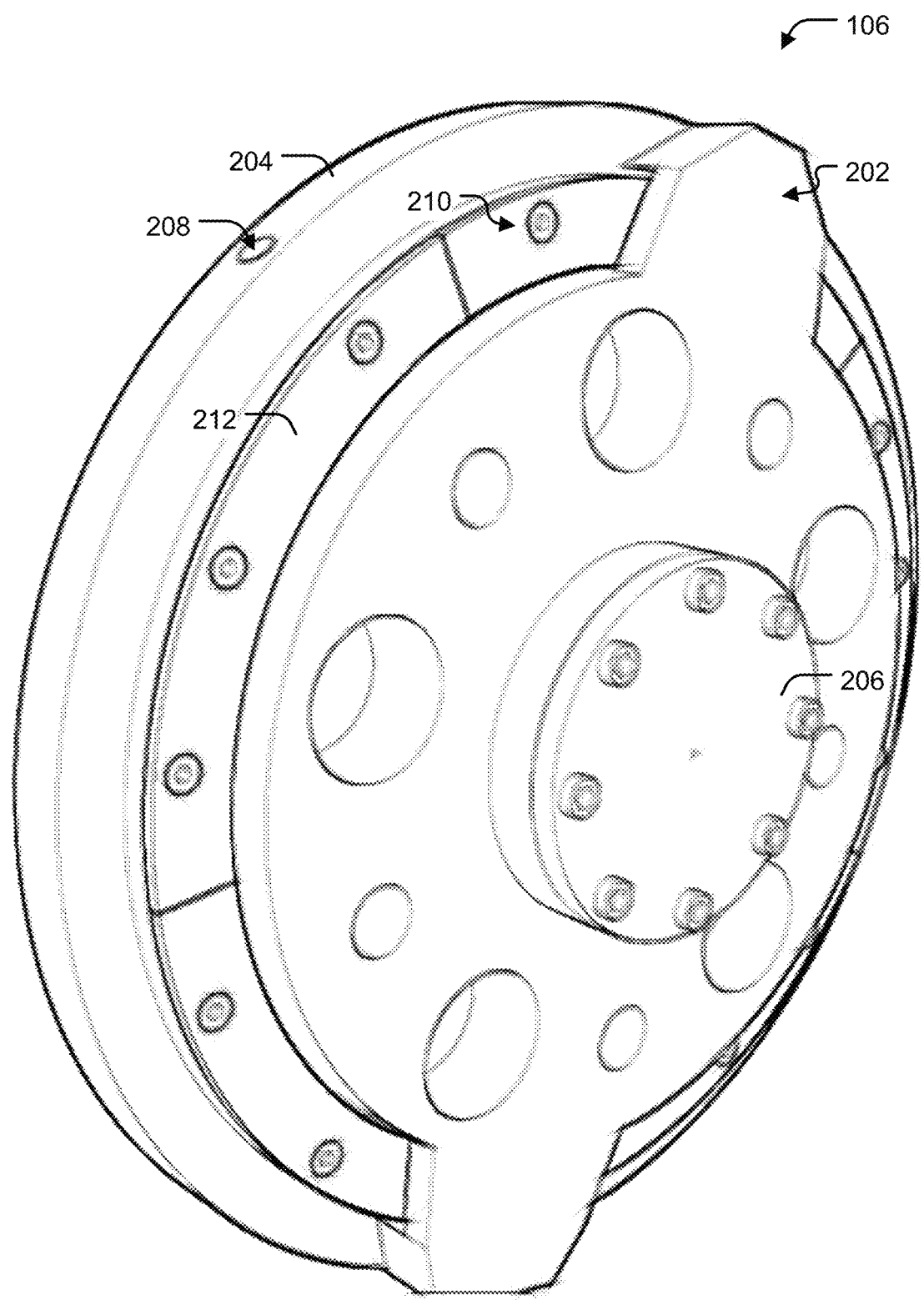
FIG. 2 is a perspective view of an air spacer hub assembly, in accordance with an exemplary embodiment of the present invention.
Figure 3:
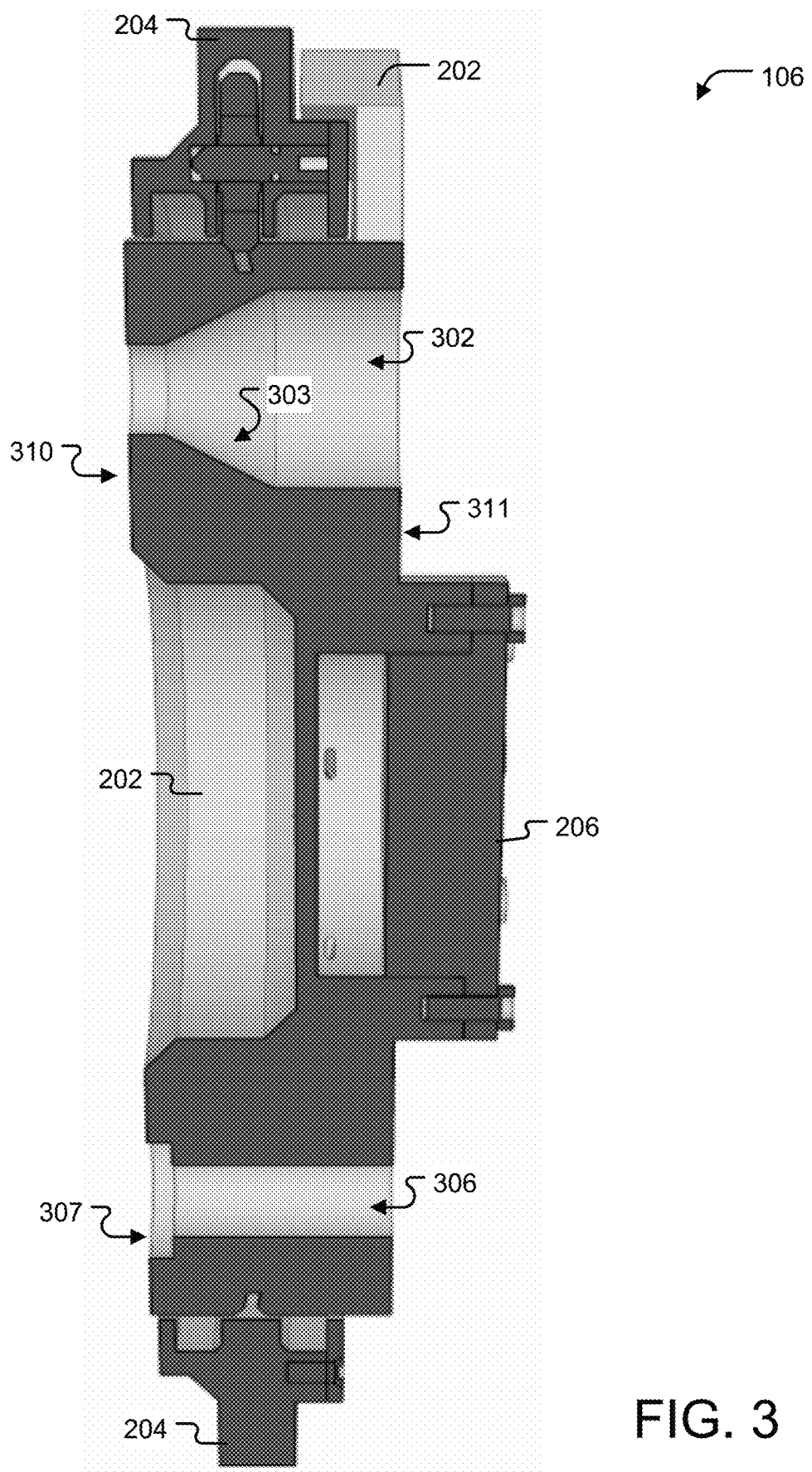
FIG. 3 is a side cut-away view of the air spacer hub assembly of FIG. 2, in accordance with an exemplary embodiment of the present invention.
Figure 4:
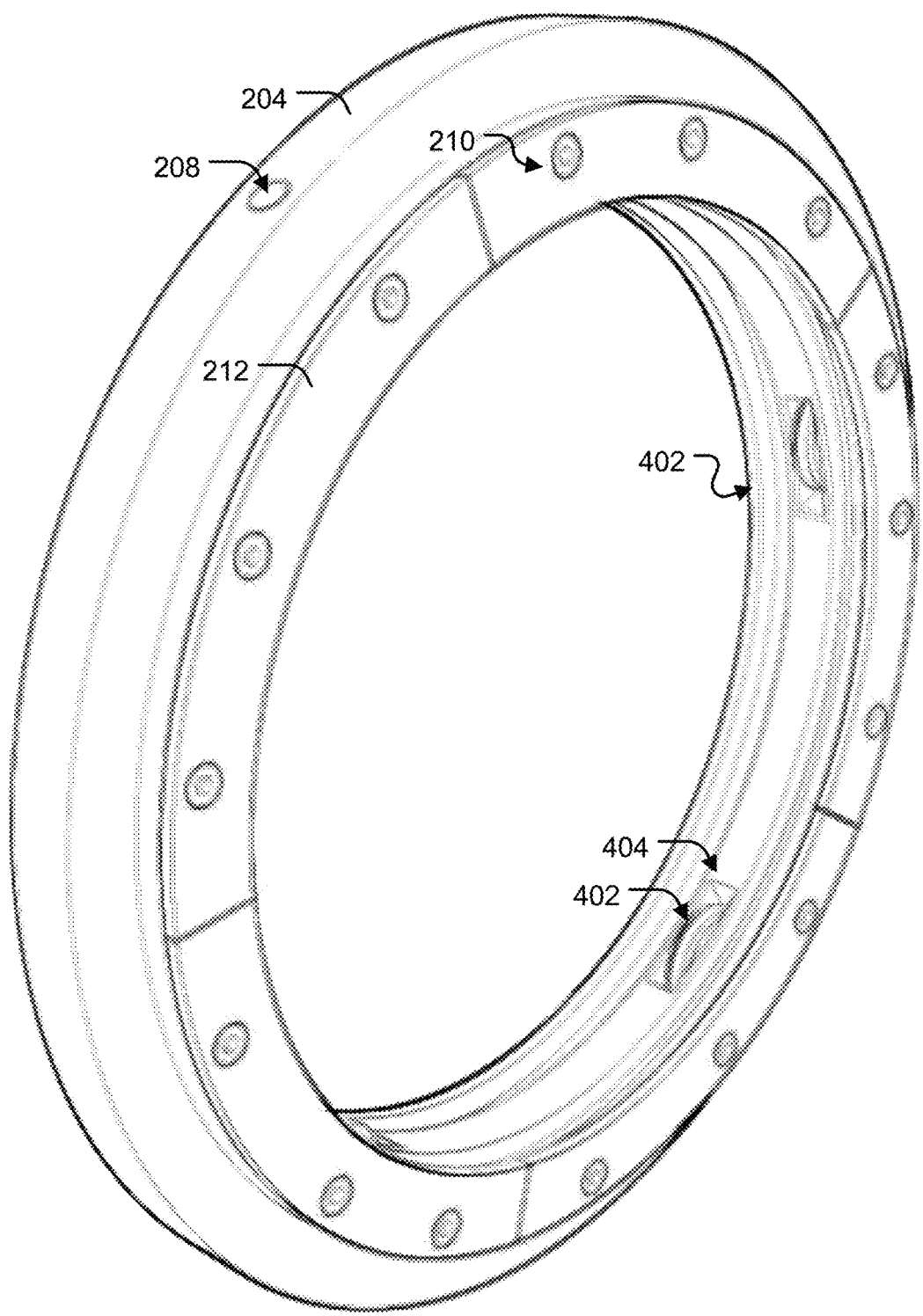
FIG. 4 is a perspective view of a ring plate of the air spacer hub assembly of FIG. 2, in accordance with an exemplary embodiment of the present invention.
Figure 5:
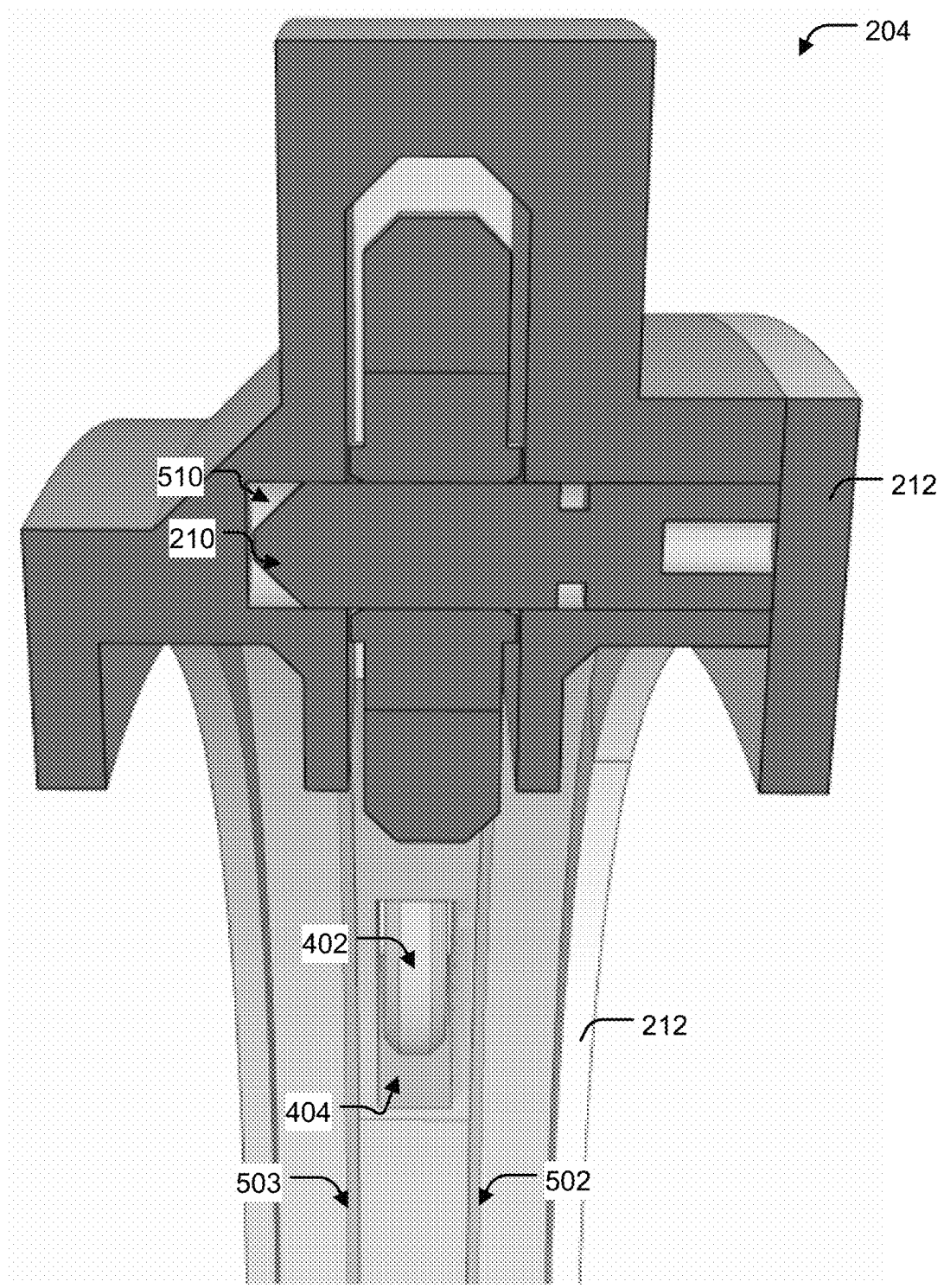
FIG. 5 is a side cut-away view of the ring plate of FIG. 4, in accordance with an exemplary embodiment of the present invention.
Figure 6:
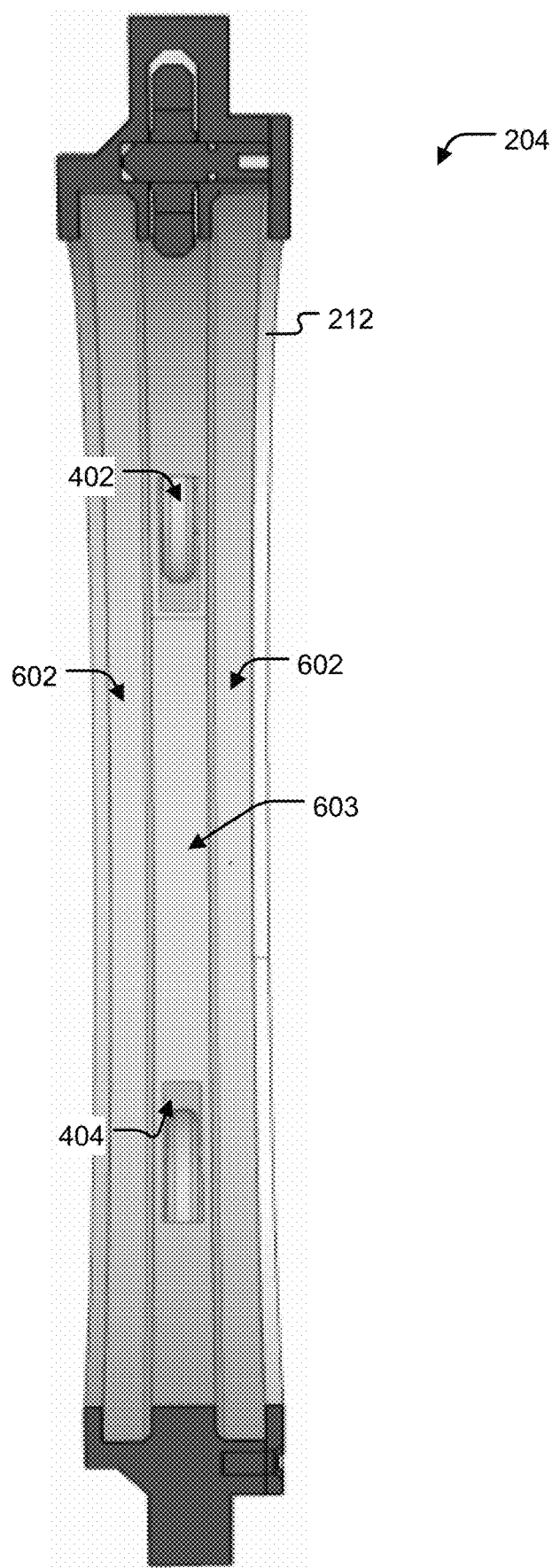
FIG. 6 is a side cut-away view of the ring plate of FIG. 4, in accordance with an exemplary embodiment of the present invention.
Figure 7:
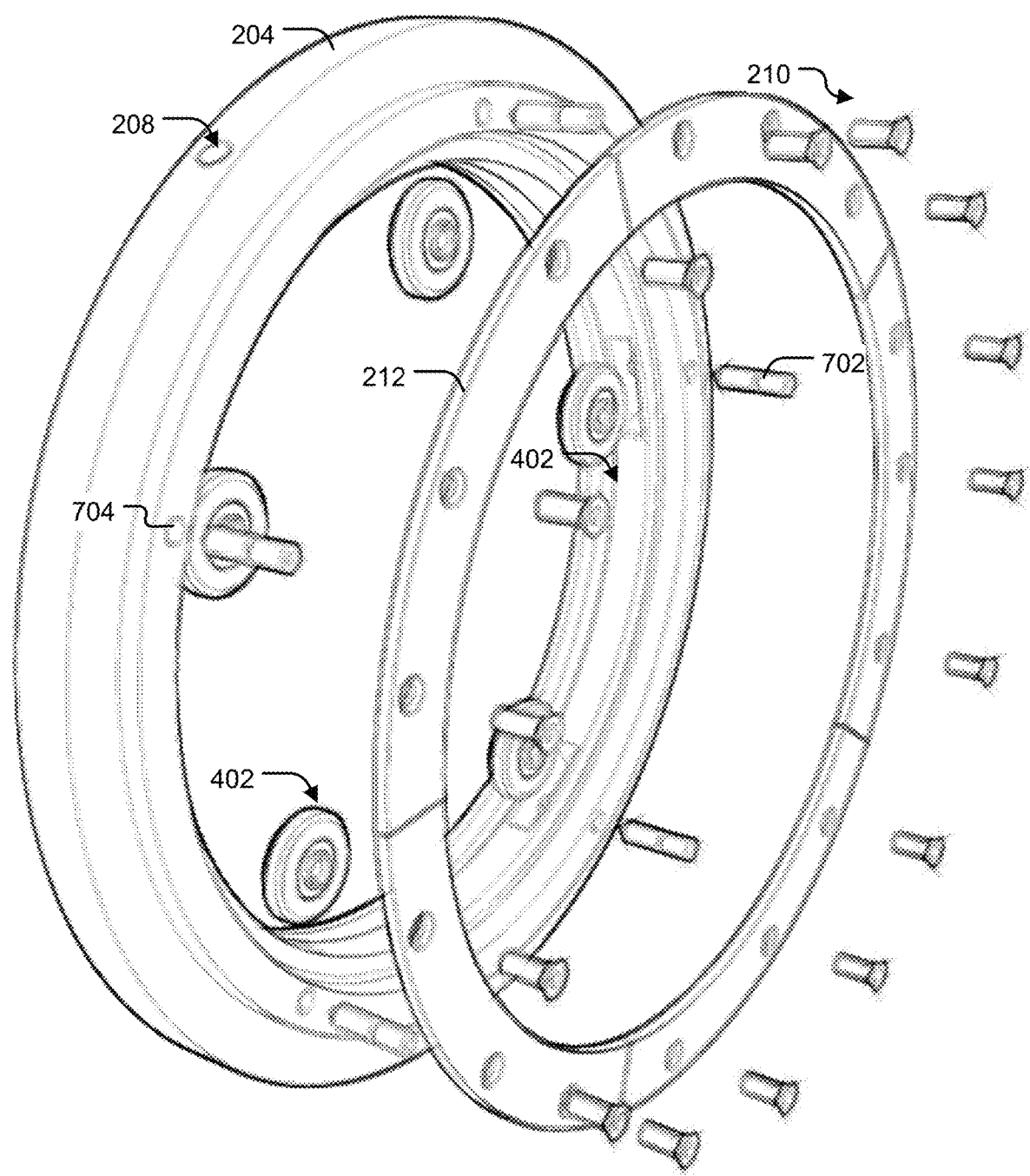
FIG. 7 is an exploded view of the ring plate of FIG. 4, in accordance with an exemplary embodiment of the present invention.
Figure 8:
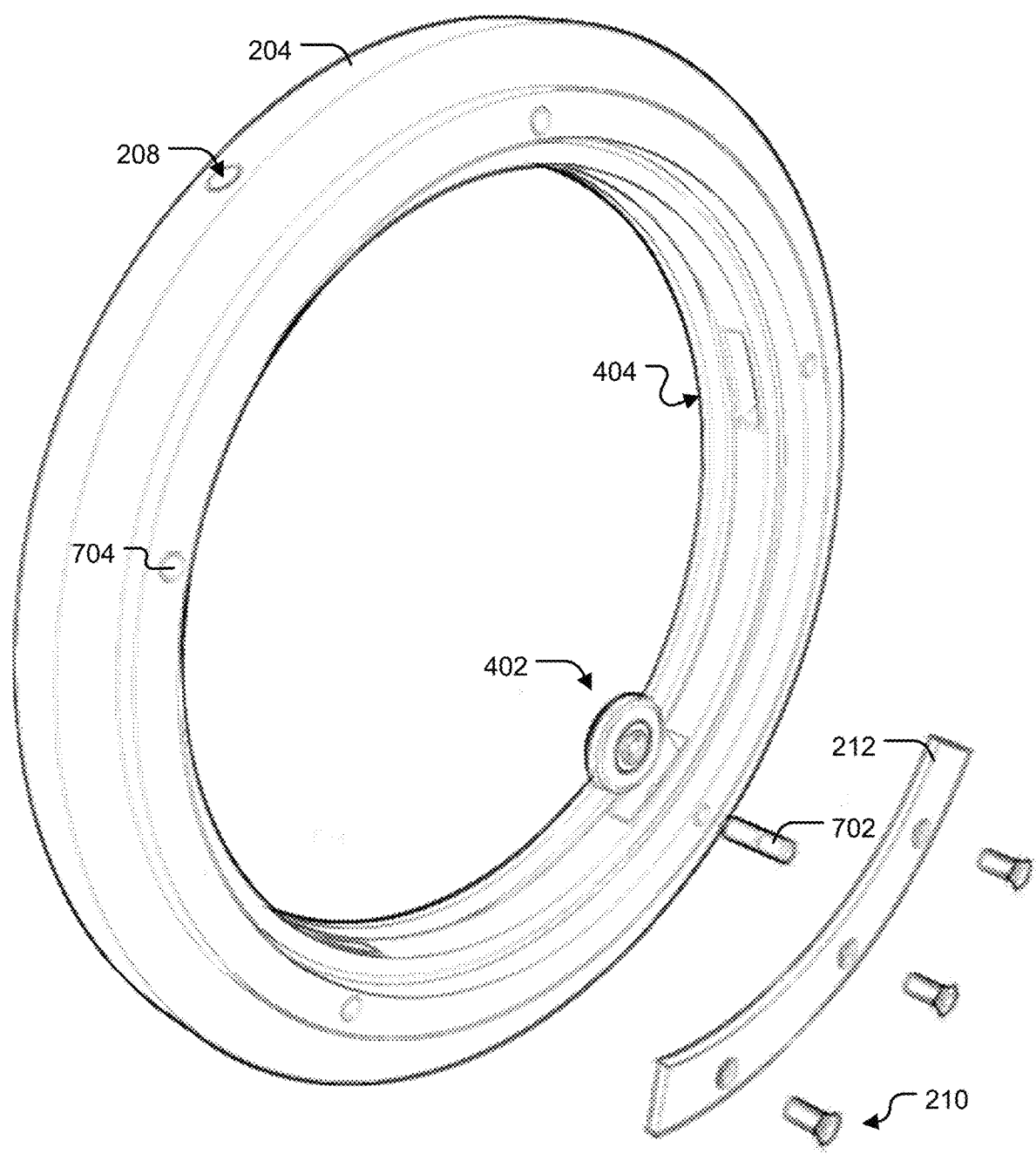
FIG. 8 is a simplified exploded view of the ring plate of FIG. 4, in accordance with an exemplary embodiment of the present invention.
Figure 9:
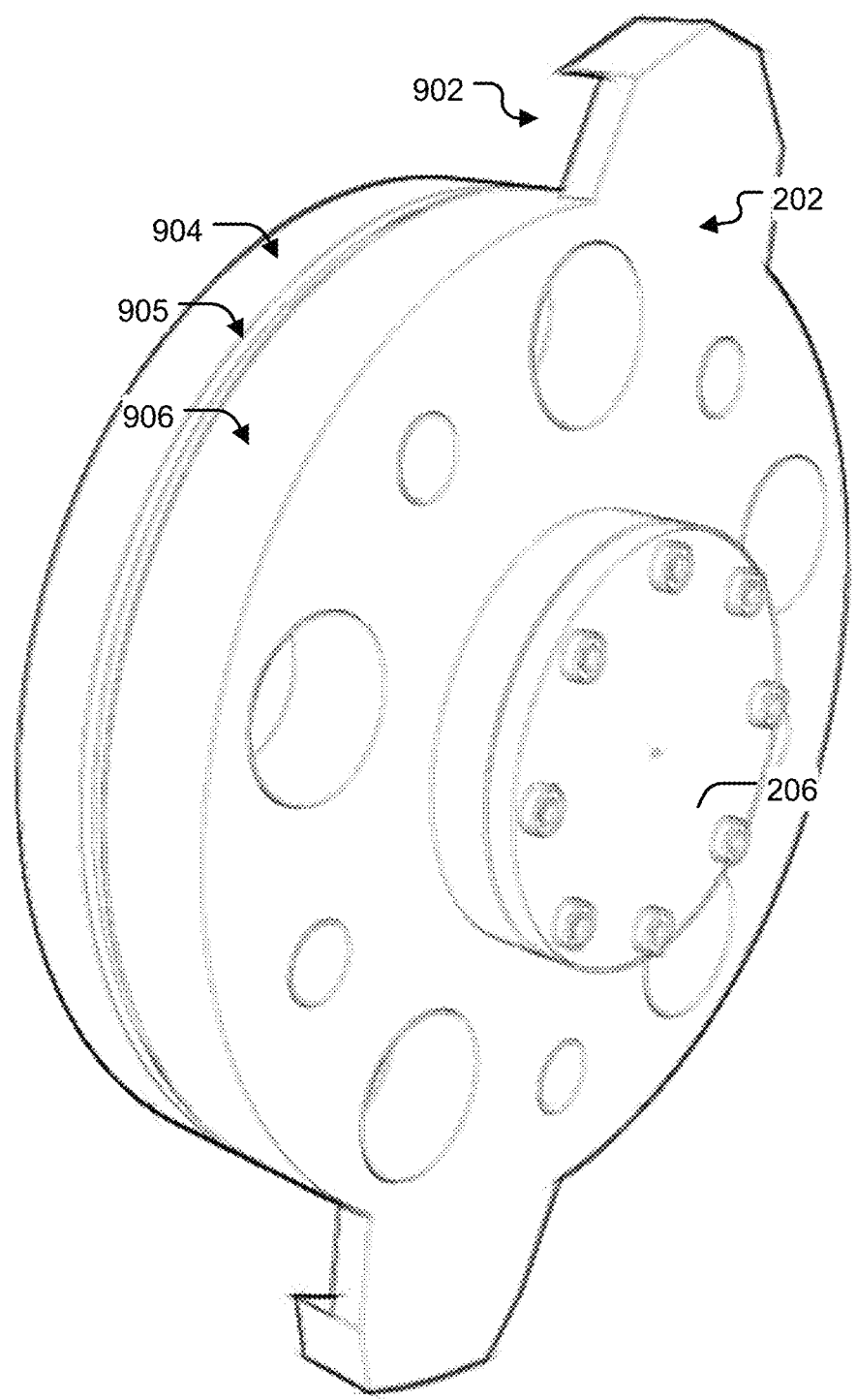
FIG. 9 is a perspective view of a rotating member of the air spacer hub assembly of FIG. 2, in accordance with an exemplary embodiment of the present invention.
Figure 10:
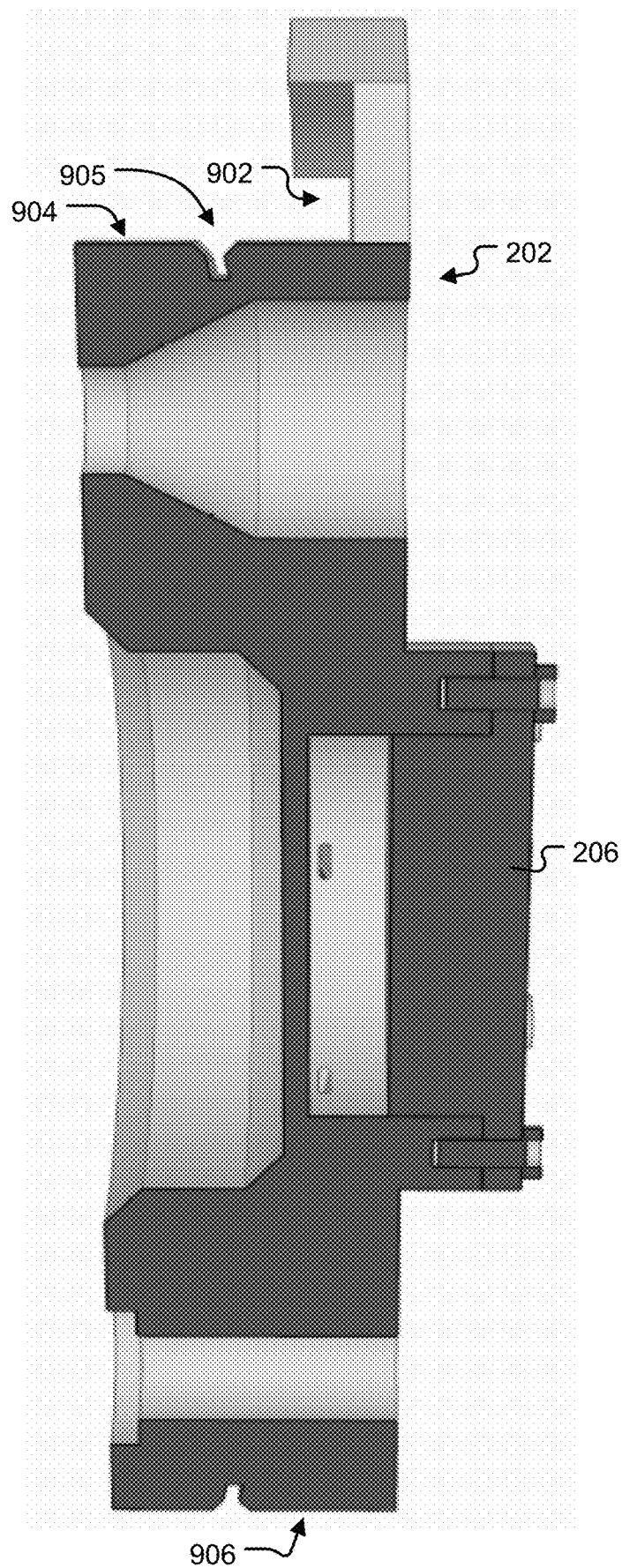
FIG. 10 is a side cut-away view of the rotating member of FIG. 9, in accordance with an exemplary embodiment of the present invention.
Figure 11:
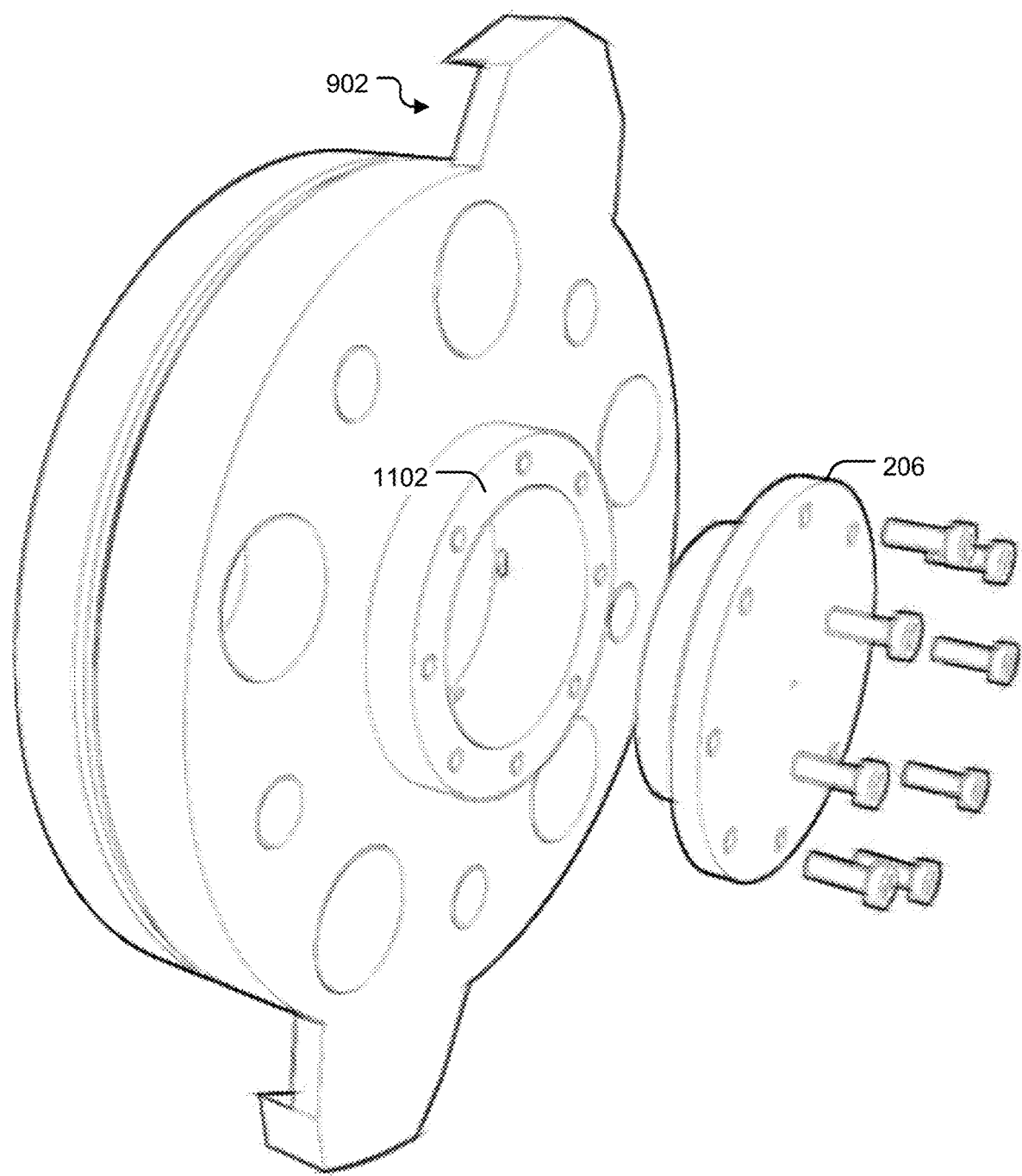
FIG. 11 is an exploded view of the rotating member of FIG. 9, in accordance with an exemplary embodiment of the present invention.

FIG. 2 is a perspective view of an air spacer hub assembly (AWS) 106, in accordance with an exemplary embodiment of the present invention. The air spacer hub assembly 106 generally includes three main components, a non-fixed rotating member 202, a fixed non-rotating member 204, and a bracket (i.e., 1202-1204) configured to maintain the fixed arrangement of the fixed non-rotating member 204 and a vehicular body or vehicle body. It is noted that bracket assembly 1202-1204 may illustrate a single possible bracket configuration. It is readily understood that the dimensions, shape, materials, mounting points, fasteners, and bolt arrangements on the bracket assembly 1202-1204 may differ greatly between different classes, types, and models of vehicles.

Figure 12:
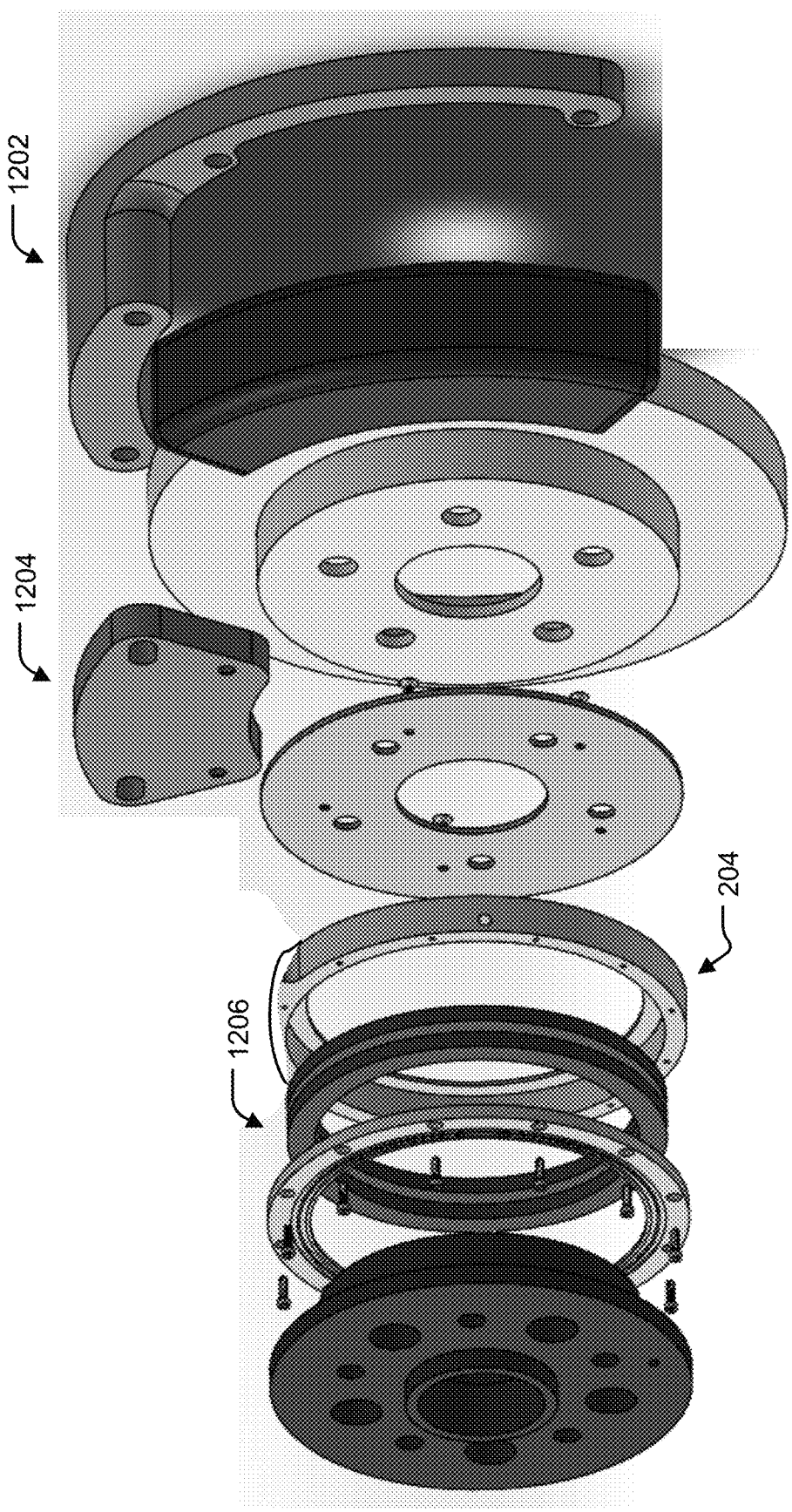
FIG. 12 is an exploded view of the air spacer hub assembly of FIG. 2, in accordance with an exemplary embodiment of the present invention.

Generally, the fixed non-rotating member 204 includes one or more mounting holes 208 configured to mount to the aforementioned bracket (i.e., 1202-1204, FIG. 12). Furthermore, the fixed non-rotating member 204 may include a plurality of shaft retaining segments 212 arranged about a surface of the fixed non-rotating member using fasteners 210. The non-fixed rotating member 202 may include a capping or hub component 206 arranged thereon.

Referring now to FIGS. 3, and 9-11, the non-fixed rotating member 202 is described in detail. The non-fixed rotating member 202 is the inner rotating portion of the AWS 106. The diameter and thickness of the associated components will vary based on vehicle year, make, and/or model. The overall thickness of the non-fixed rotating member 202, as a whole, will vary from manufacturing model to model. The varying models will serve as consumer options in deciding how much they desire to widen the vehicle's track width.

The center bore of the non-fixed rotating member 202 is such that it will fit the hub profile of the vehicle and extend from the inner axial face outward. The bore may or may not extend through to the outer axial face depending on whether or not the vehicle has extended hubs. Cap 206 is arranged on the center bore. Regarding different hub arrangements in vehicles: In non-extended hub vehicles—the bore extends to a point that it will clear the end of the vehicle axle and nut. This is the inner bore. In extended hub vehicles—the bore extends completely through the non-fixed rotating member 202. This is the center bore.

A hub profile exists on the outer axial face matching that of the vehicle's hub profile. This ensures proper alignment of the wheel to the vehicle. In non-extended hub vehicles—a bore exists within the new hub profile extending axially inward but not through to the inner bore as described above. This is the outer bore. In extended hub vehicles—some of these vehicles will not be hub-centric and no hub profile will exist.

With regards to bolt patterns, one or more bolt patterns are present axially through the non-fixed rotating member 202. According to one aspect with a single bolt pattern, a longer wheel stud may be used. The longer wheel stud may replace the stock shorter studs allowing the longer stud to pass completely through the AWS 106. Accordingly, the AWS 106 would be "sandwiched" between a wheel brake system and the actual wheel 107. Lug nuts may be installed onto the longer wheel studs over the wheel.

According to one aspect with two bolt patterns, the first bolt pattern matches the vehicle bolt pattern. A larger diameter hole 302 extends from the outer face 311 of the thickness inward, but not through, and the lug nut seat 303 is formed. The diameter of this larger hole 302 is sufficient to allow use of socket to install/remove lug nuts.

According to one aspect with two bolt patterns, the second bolt pattern allows for installation of a new set of wheel studs which are installed from the inner face through thickness of the non-fixed rotating member 202. The diameter of the holes 306 will vary based on stud size and will allow for studs to be pressed in. A shallow relief 307 exists on the inner face 310 into the thickness so the stud heads rest below the inner face 310 ensuring there is no interference with the vehicle's wheel mounting surface. The new studs will extend axially through the non-fixed rotating member 202 to varying lengths based on vehicle application. This pattern may match the vehicle pattern or may be different allowing for different wheels to be used. This allows the possibility of using the AWS 106 as a wheel adapter as well.

Thus, the non-fixed rotating member 202 comprises a plurality of apertures 302 and 306 configured to facilitate mounting of the tire. Generally, the plurality of apertures 302/306 numbers twice as many as tire lug bolts for a single tire. Therefore, a first half of the plurality of apertures (i.e., 302) is configured to receive the tire lug bolts, and a second half of the plurality of apertures (i.e., 306) is configured to attach the tire to the non-fixed rotating member.

The outer radial face of the non-fixed rotating member 202 is a dynamic seal surface 904. Seals will serve to create an air chamber in an area between seals and between non-fixed rotating member 202 and the fixed non-rotating member 204.

Alignment between the non-fixed rotating member 202 and the fixed non-rotating member 204 is accomplished with an interior track and an array of bearings. The track 905 is profiled into the outer radial surface 904 of the non-fixed rotating member 202 between the dynamic seal surface areas.

The movement of air from vehicle chassis to tire travels from the fixed non-rotating member 204 and through the non-fixed rotating member 202. At least one air pathways is provided. However, multiple pathways may also be implemented. Pathways are present within the non-fixed rotating member 202 starting at the center of the track and continuing radially inward.

Air pathway(s) may continue into the outer bore. Air pathway(s) may continue to the outer radial surface of flange 902 that extends radially from the outer axial face of the non-fixed rotating member 202 where a connection is made to wheel/tire assembly. Air pathway(s) may continue into the outer bore and then be routed through a flange with a fixed air nozzle penetrating into an interior of a tire space. Accordingly, while the non-fixed rotating member 202 does rotate, the rotation is only with relation to the vehicle—i.e., there is no or very little movement between the non-fixed rotating member 202 and the tire. Thus, the dynamic air seal using surface 904 allows air to move from a fixed position related to the vehicle to the non-fixed rotating member 202 and flanges 902.

It is noted that in vehicle models where air is routed to the outer bore there will be a cap 206 to enclose the bore area creating a second air chamber. The cap 206 may be completely closed, and pathway(s) may be routed through flange 902. The cap 206 may have a connection point on outer axial face 1102 for attachment of hose to wheel/tire assembly 107. The cap 206 may be such that a valve is present to control the flow of air between the wheel/tire 107 and the AWS 106.

The configuration of the cap 206 can be such that air may be routed through non-fixed rotating member 202, flange 902, or out of cap 206.

With the presence of the valve, electrical contacts may be needed. A contact strip can be installed, isolated from non-fixed rotating member 202, on the outer radial surface of the non-fixed rotating member 202. Wire(s) can be routed through air pathway into outer bore to make connection with valve.

Turning to FIGS. 4-8, reference and description of the fixed non-rotating member 204 is made. Sometimes referred to as a "ring," the fixed non-rotating member 204 is the outer non-rotating portion of the AWS 106. The specific shape and profile of the fixed non-rotating member 204 will vary based on vehicle to ensure there is room for all components and no interference occurs with vehicle components. Overall design characteristics are as follows:

Seal Grooves 502-503 of fixed non-rotating member 204 between at least one seal surface—There are two (2) seal grooves 502-503 extending radially outward into the inner diameter surface. The width and depth of the grooves 502-503 will be specific to the seal being used. The grooves 502-503 form at least a portion of the static sealing surface. Air will be transferred from static to rotating in the air chamber created within the area between the interacting seal surfaces of the fixed non-rotating member 204 and the non-fixed rotating member 202. More clearly, an air chamber is defined within a volume between interacting the at least one first seal surface (i.e., static sealing surface) and the at least one second seal surface (i.e., outer radial surface of 202) causes fluid communication between an interior space of the tire 107 and the compressed air source 116/118.

It is noted that a seal is not illustrated for clarity of discussion of components obfuscated by the seals. Seal grooves 502-503 are illustrated to show placement of any desired sealing member. FIG. 12 depicts seal 1206 and its alignment relative to fixed non-rotating member 204.

Bearing Pockets 404—Reliefs/pockets 404 are present extending radially outward into the inner diameter surface, but not through to outer diameter, of the fixed non-rotating member 204. The depth of each pocket 404 will be sufficient to allow bearings 402 to slide radially outward to pass over outer diameter of the non-fixed rotating member 202. There will be a differing number of bearing pockets distributed about the fixed non-rotating member 204 based on vehicle application and bolt patterns utilized. According to one aspect, the bearing pockets 404 are equally spaced about the fixed non-rotating member 204. According to a different aspect, the bearing pockets 404 are distributed about the fixed non-rotating member 204 with unequal spacing. According to yet another aspect, the bearing pockets 204 each have different spacing about the fixed non-rotating member 204.

A relief exists into the outer axial face. A shaft cover 212 exists and is fastened over this relief. The cover 212 is used to retain bearing shafts. Shaft holes 510 extend from the outer face of the relief inward through the pocket and into the thickness on the other side, but not through. The shaft 510 is tapered at inward end to pull bearings radially inward and into contact with track.

Guide Bearings 402—Bearings 402 will have a flange 602 on both sides of the inner race 603 to keep moving parts from contacting bearing pocket 404 and serve to hold axial alignment. Bearings outer race profile will mate with alignment track to keep radial and axial alignment between ring and spacer.

Bearing Shaft 702—The bearing shaft 702 is tapered on the inner end. Because the bearings 402 must slide radially outward to pass over the non-fixed rotating member 202 then inward to make contact with track 603, the shaft taper will serve to move a bearing 402 inward as it is inserted and seat the bearing in proper position when fully installed. The shaft 702 is held in position with the shaft cover 212.

Attachment to Bracket—A tapped hole 208 exists from the outer diameter face radially inward but not through inner diameter. A bushing is inserted into the bracket 1202-1204 and a bolt through the bushing will connect the fixed non-rotating member 204 to the bracket 1202-1204. The bushing will serve to isolate the fixed non-rotating member 204 from the vehicle chassis and help to absorb impacts and vibrations.

(Hub Cap) Valve Models—For models with an electrically controlled valve in the non-fixed rotating member 202 hub cap 206, an actuated rod can be present into the outer radial surface. The actuated rod will serve to complete an electrical circuit to power the valve. The rod may be pneumatically or electrically actuated. In other aspects, a mechanical valve may be used such that no electrical contacts are needed.

Bracket 1202-1204 can attach to a relatively fixed point on the vehicle, for example, an axle, brake caliper, or other point. Attachment points will vary based on vehicle. On steering axles, the attachment point can be on the knuckle so that the bracket turns when the steering wheel is turned. The bracket 1202-1204 will extend radially and axially outward over brake system and specific shape/bends will vary based on vehicle. A rubber grommet will be inserted into bracket and a bolt passed through will attach to the ring. The grommet and bolt will serve to electrically isolate the ring from the chassis and allow for small rotational and radial movements of the ring as well as serve to absorb heavy impacts.

Figure 13A:
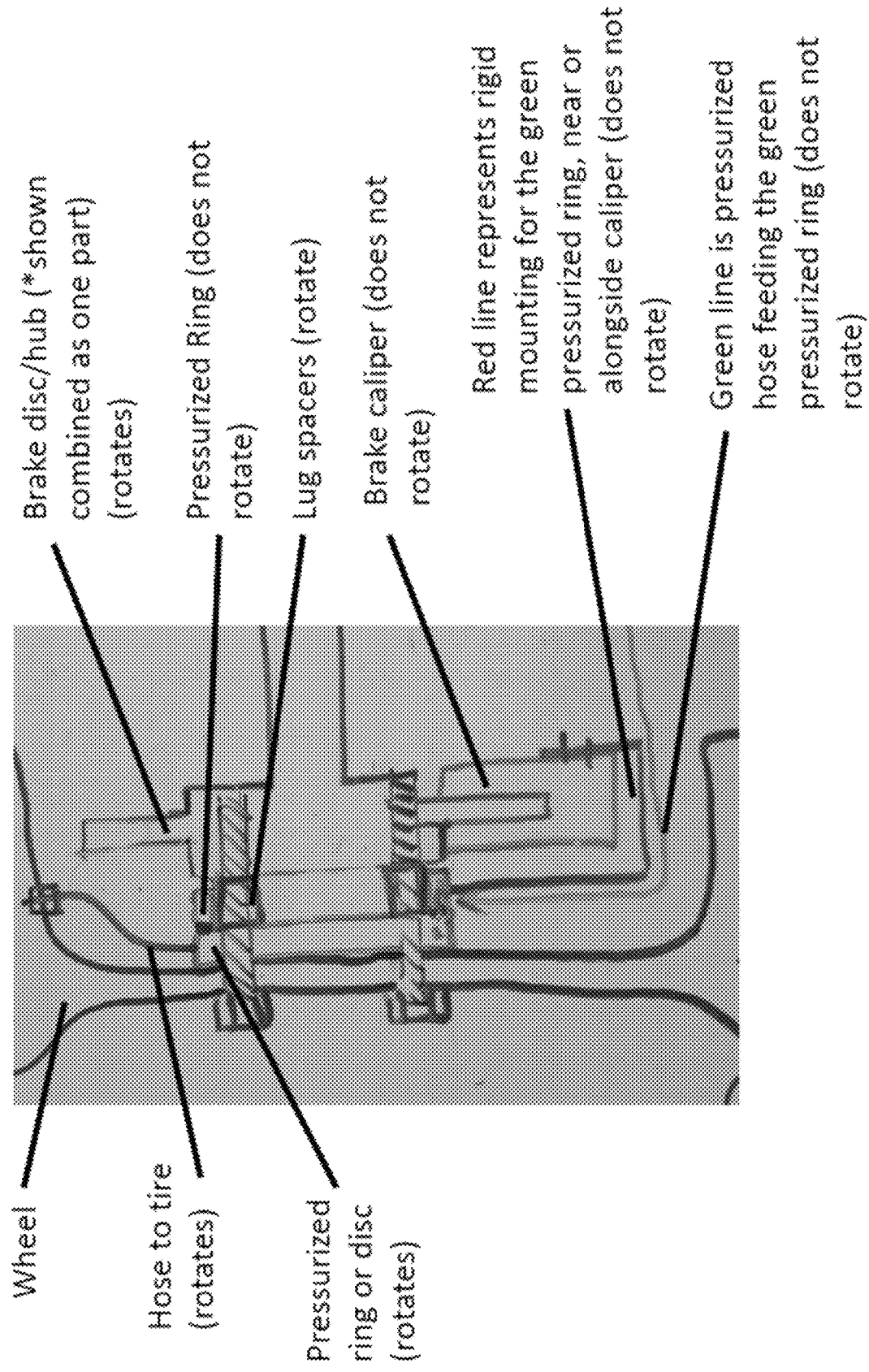
FIG. 13A and FIG. 13B illustrate component installation configuration of a disclosed system in accordance with another exemplary embodiment of the present invention.
Figure 13B:
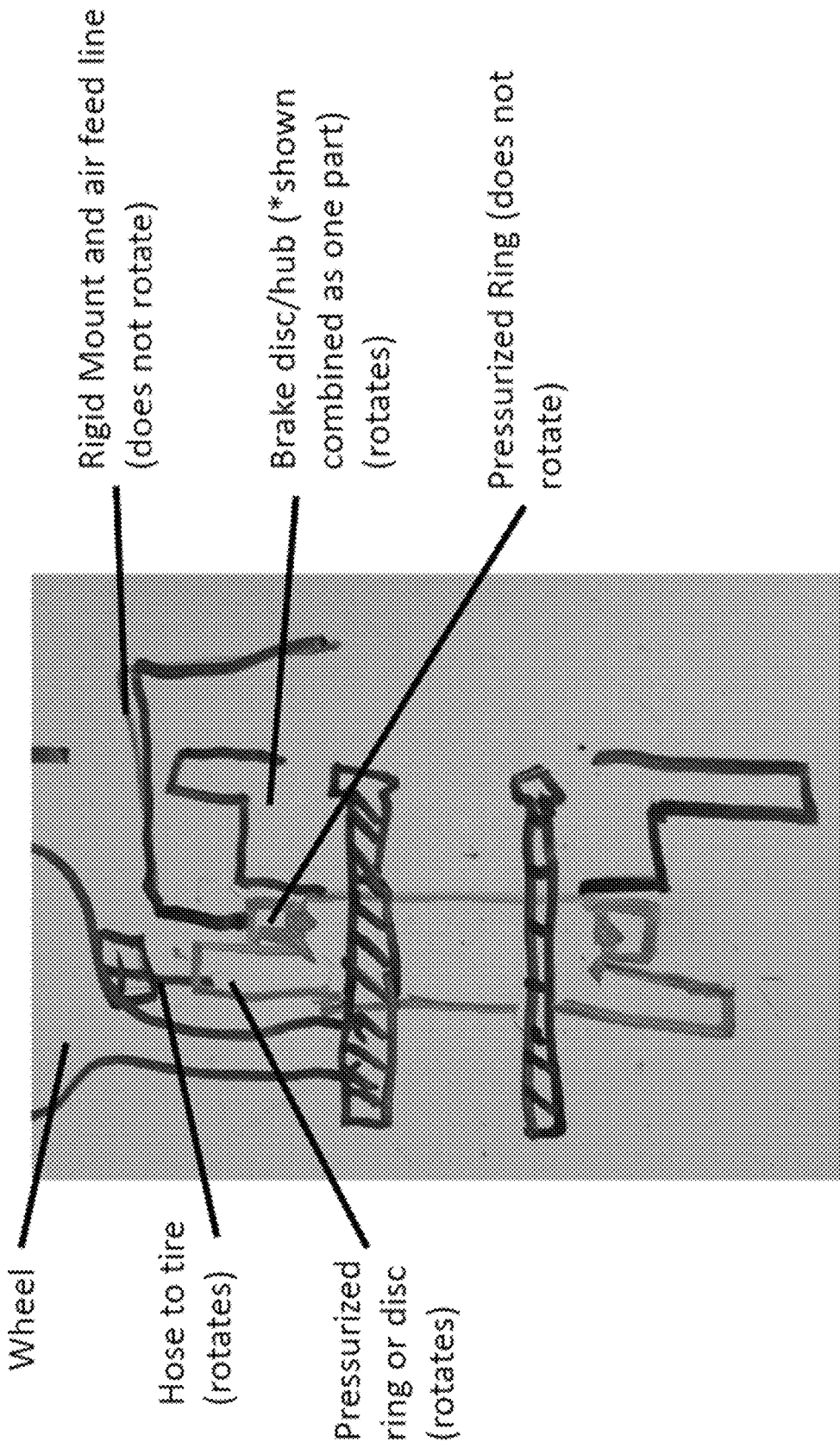

Air Pathway(s)—At least one air pathway will extend from the outer diameter face radially through the inner diameter, a fitting will be attached, and a connection made to hoses installed on vehicle chassis leading to DVM 112. By way of non-limiting example, FIGS. 13A and 13B show approximate mounting locations of the vehicle where one or more system components can be correspondingly attached to the vehicle including air pathway(s). For example, the position of the air spacer devices can be configured or changed with respect to the characteristics of the wheel or vehicle. For example, positions of the mounting can include below and/or above the vehicle hub.

FIGS. 16-26 depict an additional exemplary air spacer hub assembly used in various embodiments of the disclosed devices and systems. It is noted that portions or the entirety of the components and features described with relation to FIGS. 16-26 may be interchangeably mixed with the teachings, features, and components described with reference to FIGS. 2-15. Accordingly, aspects of any portion of this disclosure may be additionally applied to any other portion.

Figure 16:
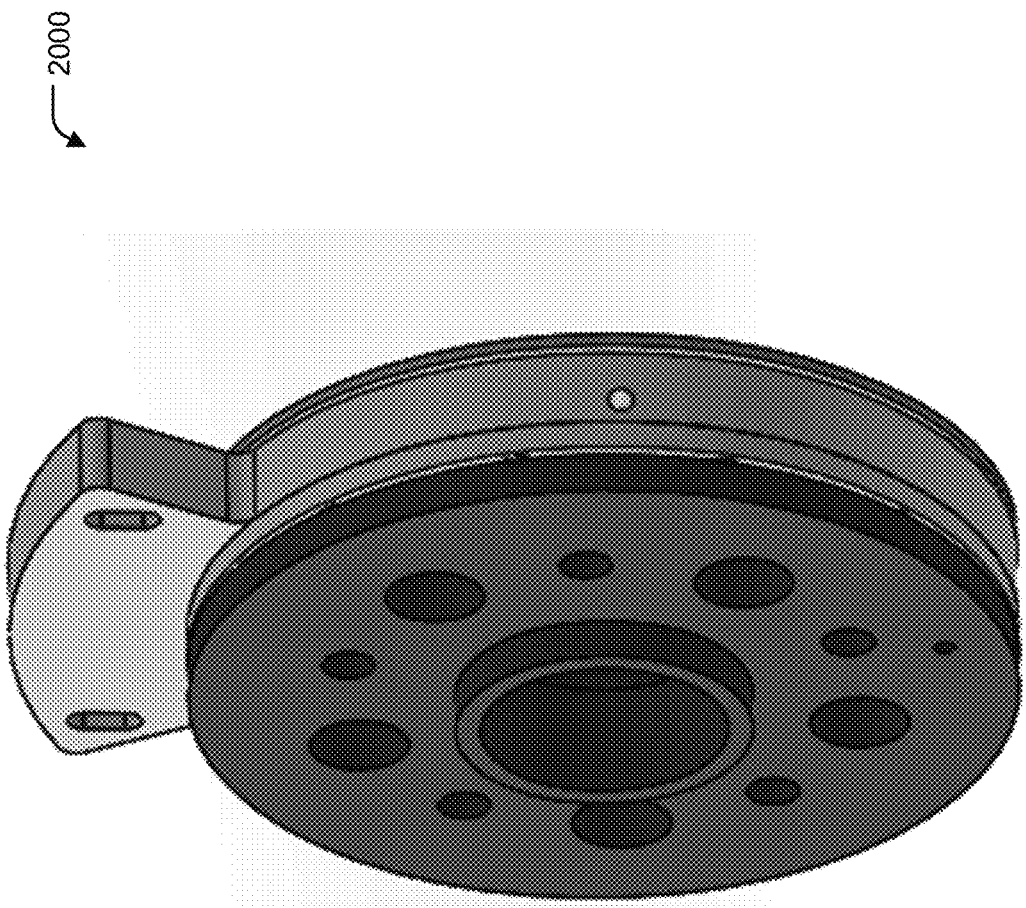
FIG. 16 shows a depiction of an air spacer hub assembly in accordance with an exemplary embodiment of the present invention.
Figure 17:
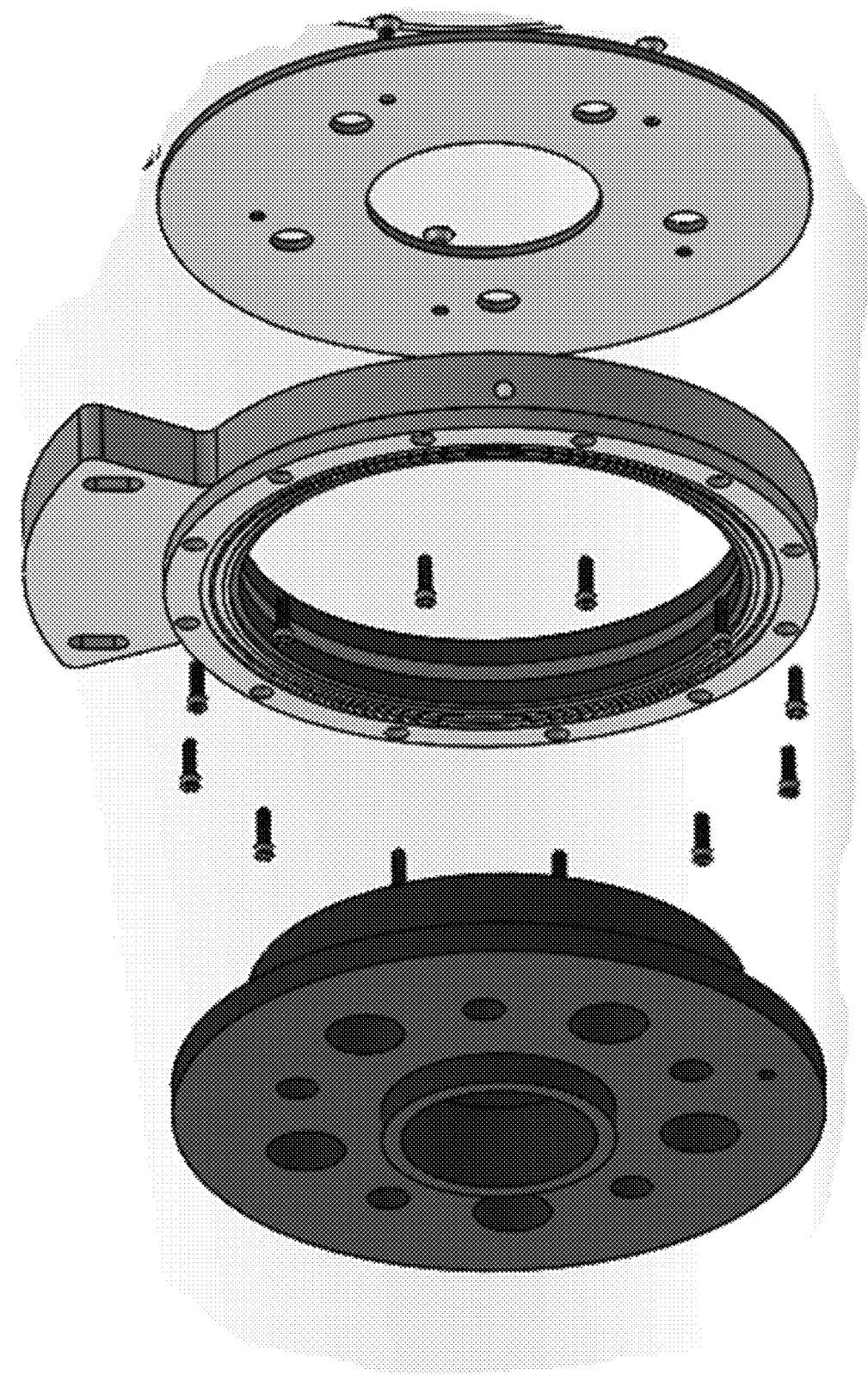
FIG. 17 shows an exploded view depicting an air spacer hub assembly in accordance with an exemplary embodiment of the present invention.

FIGS. 16-17 depict the exemplary hub spacer assembly 2000. As shown, the air spacer hub assembly can generally comprise a first (outer) plate or disk, a second (inner) plate or disk, and a (central) ring plate.

In further aspects, the first (outer) plate or disk can have a first edge defining a first circumference of a first portion of the first plate and a second recessed edge defining a second circumference of a second portion of the first plate. In still further aspects, the first plate can comprise an air channel having a first opening disposed on a surface of the first edge and a second opening disposed on a surface of the second edge, the air channel extending between the first and second openings. In even further aspects, the second (inner) plate [or disk] can have a first edge defining a first circumference of the second plate. In still further aspects, the second plate being configured to couple to the first plate. The coupled plates are configured to attach to and rotate with a wheel of a vehicle. The first and second plates can comprise apertures or holes through which the bolts for the wheel to pass.

Figure 18:
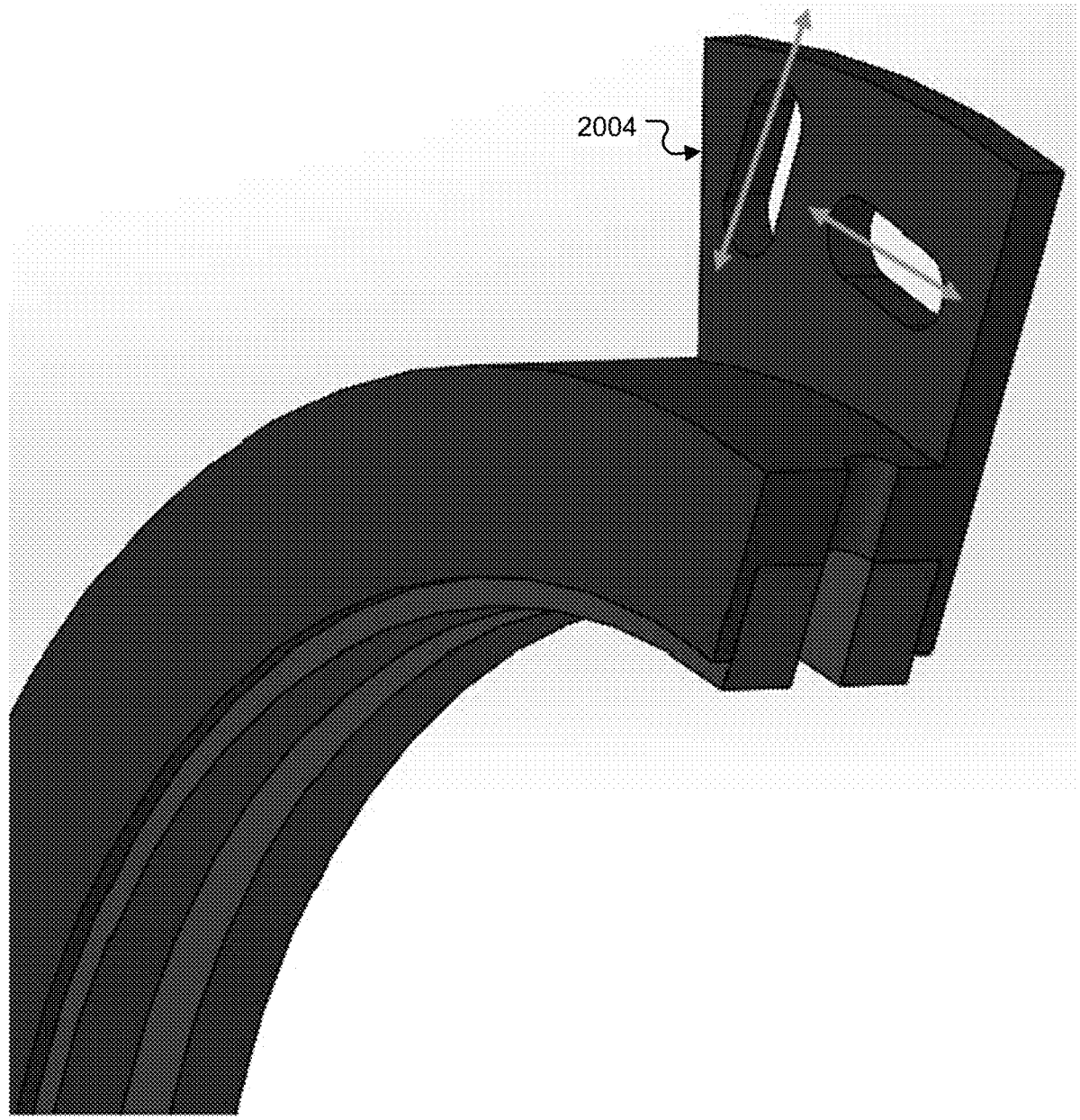
FIG. 18 shows a cross section view depicting a ring plate used in connection with an air spacer device in accordance with an exemplary embodiment of the present invention.
Figure 19:
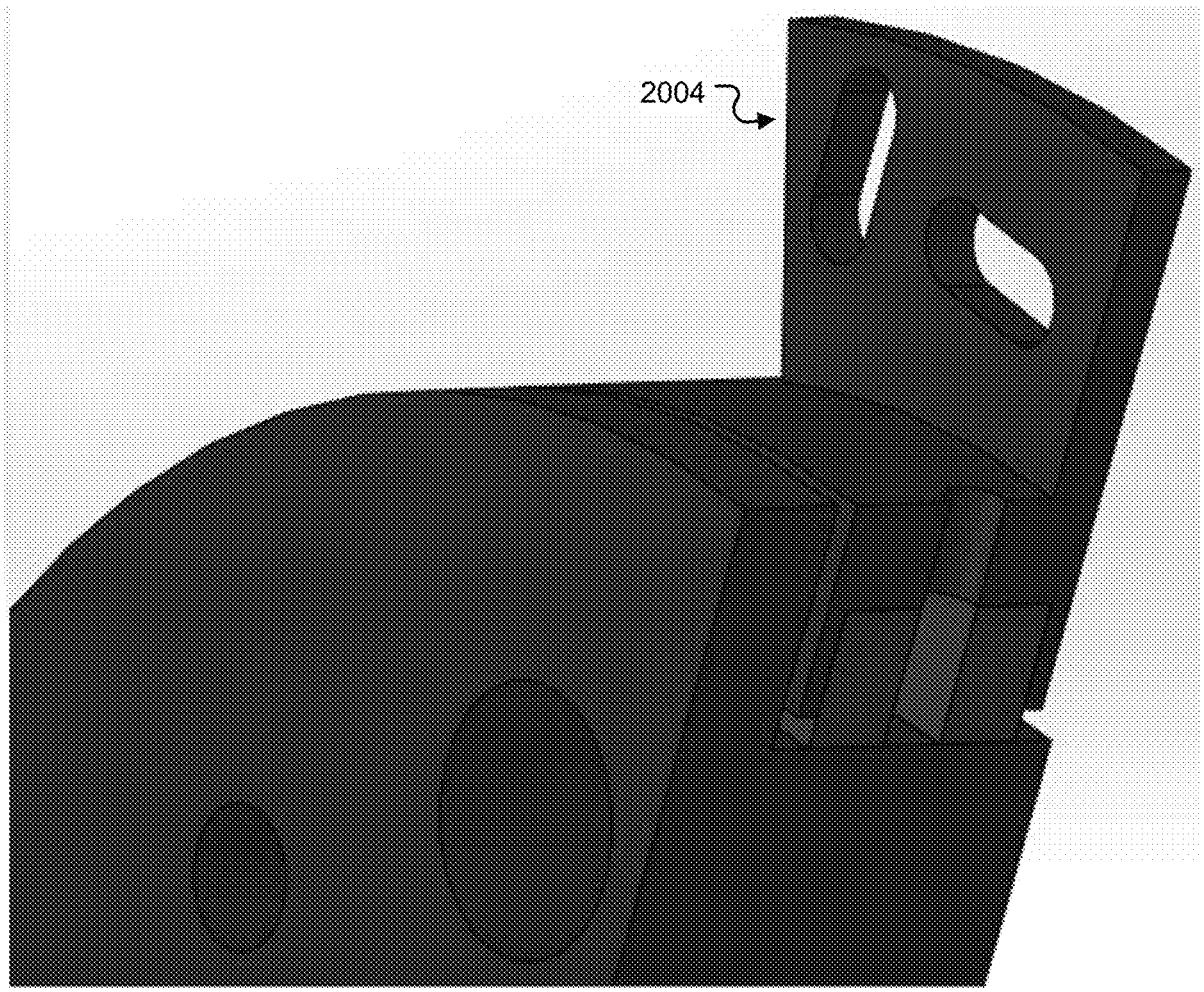
FIG. 19 shows a cross section view depicting a ring plate and a first plate used in connection with an air spacer device in accordance with an exemplary embodiment of the present invention.

In further aspects, the middle or central ring plate is stationary and is connected to a rigid point on the vehicle. In still further aspects, the ring plate can comprise a mounting portion configured to connect to a portion of the vehicle. In even further aspects, the mounting portion can comprise a planar plate section extending out from an outermost edge of the ring plate. As shown in FIG. 18, the mounting portion may comprise a plurality of apertures or slots 2004 for adjustably attaching to a plurality of mounting locations on the vehicle, and to allow for proper alignment. For example, when the ring plate is loosely bolted to the car, it is still able to translate within the slots. Thus, after other components are coupled, such as inserting a portion of the outer plate as shown in FIG. 19, the slotted bolts can then be tightened to lock the alignment.

In further aspects, the ring plate can have a first (outer) edge defining a first circumference and a second (inner) edge defining a second circumference. In still further aspects, the ring plate can also have an air channel having a first opening disposed on a surface of the first edge and a second opening disposed on a surface of the second edge, the air channel extending between the first and second openings.

In further aspects, the ring plate can be connected or attached to the vehicle using at least one of a mount, bracket, connector, or adapter, or the like. For example, in some aspects, the ring plate can be connected using a bracket attached to a brake caliper. In other aspects, the ring plate may be connected or attached to a different, fixed portion of the vehicle.

Figure 20:
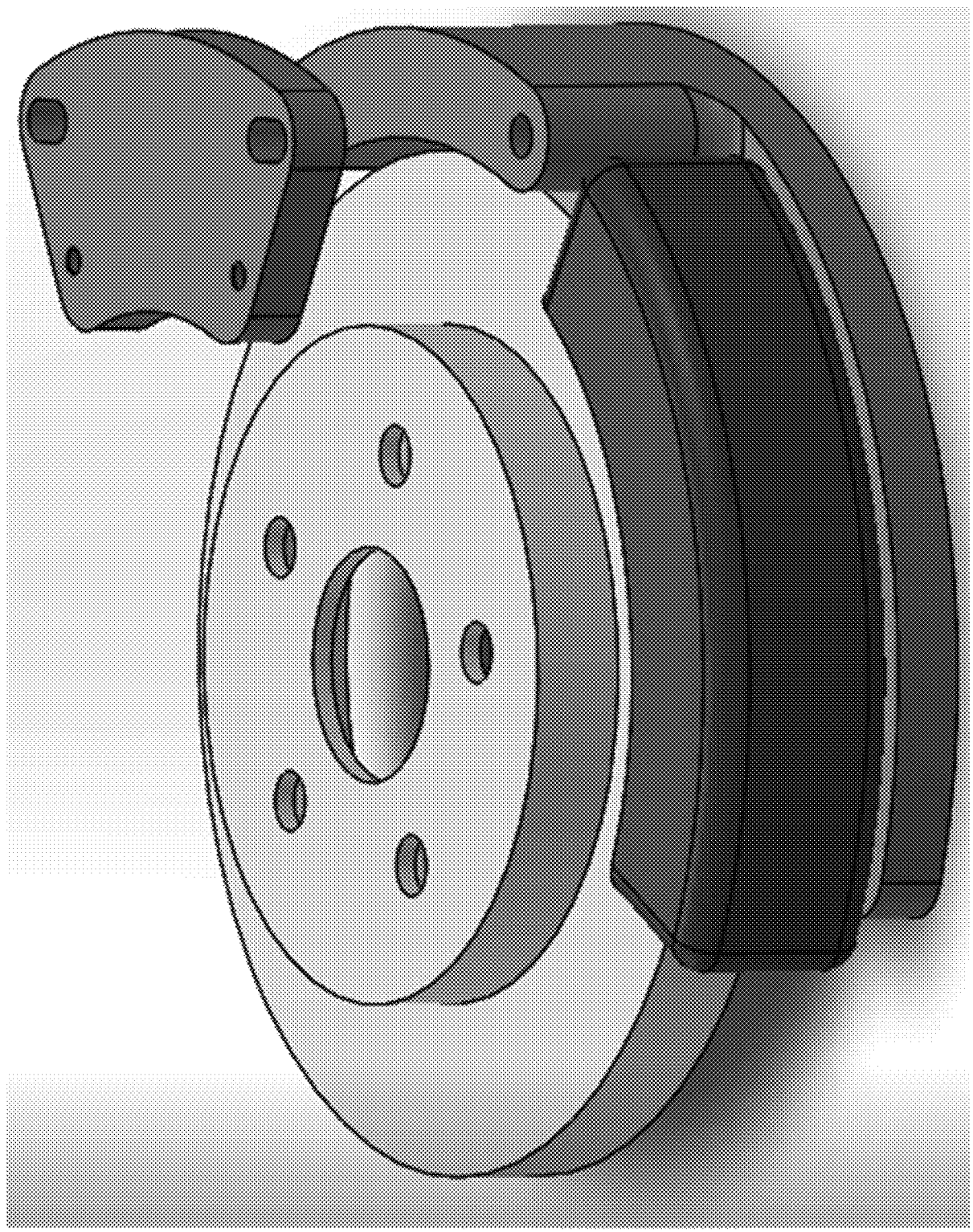
FIG. 20 shows a depiction of bracket for mounting an air spacer device in accordance with an exemplary embodiment of the present invention.
Figure 21:
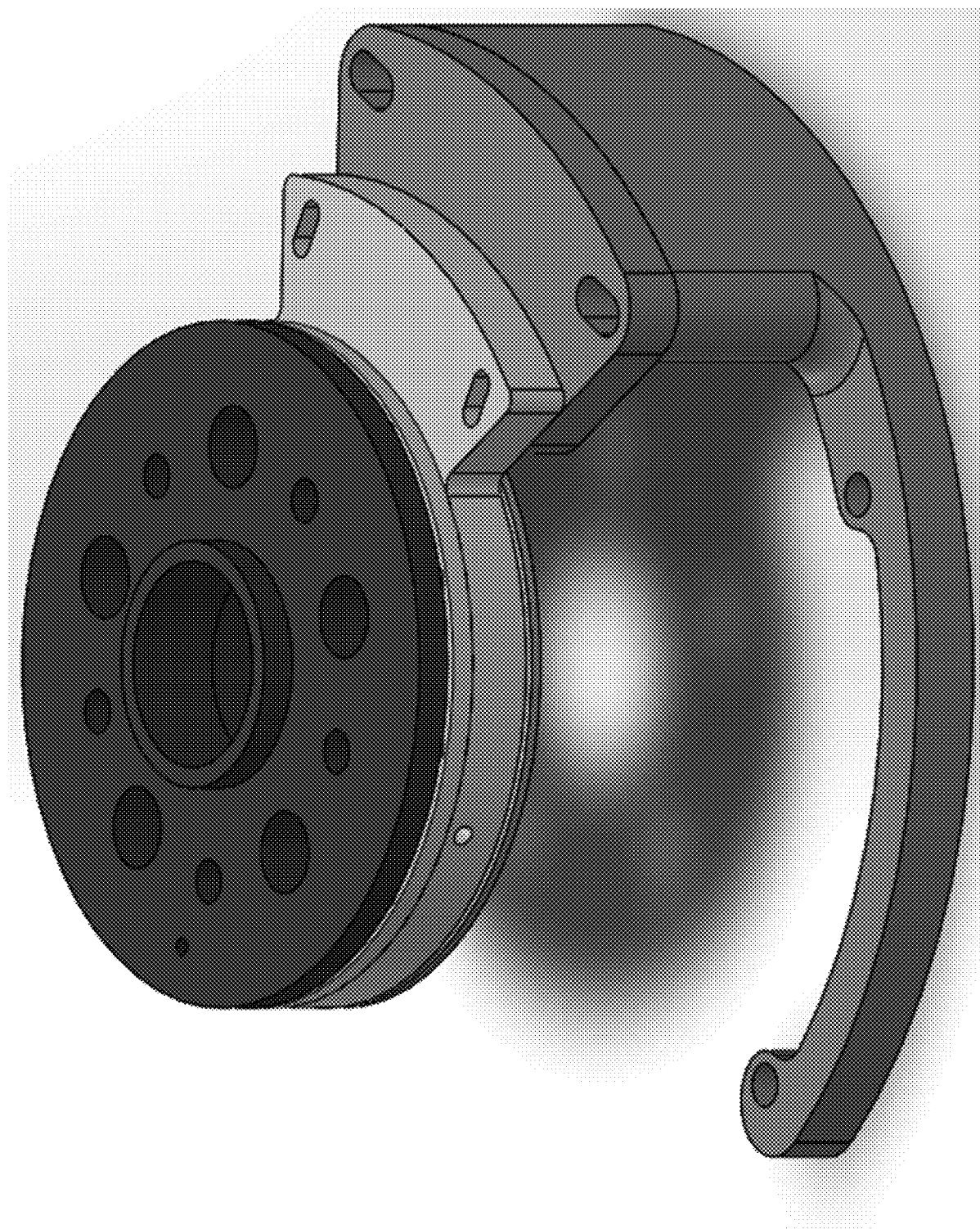
FIG. 21 shows a depiction of an air spacer device in accordance with an exemplary embodiment of the present invention.
Figure 22:
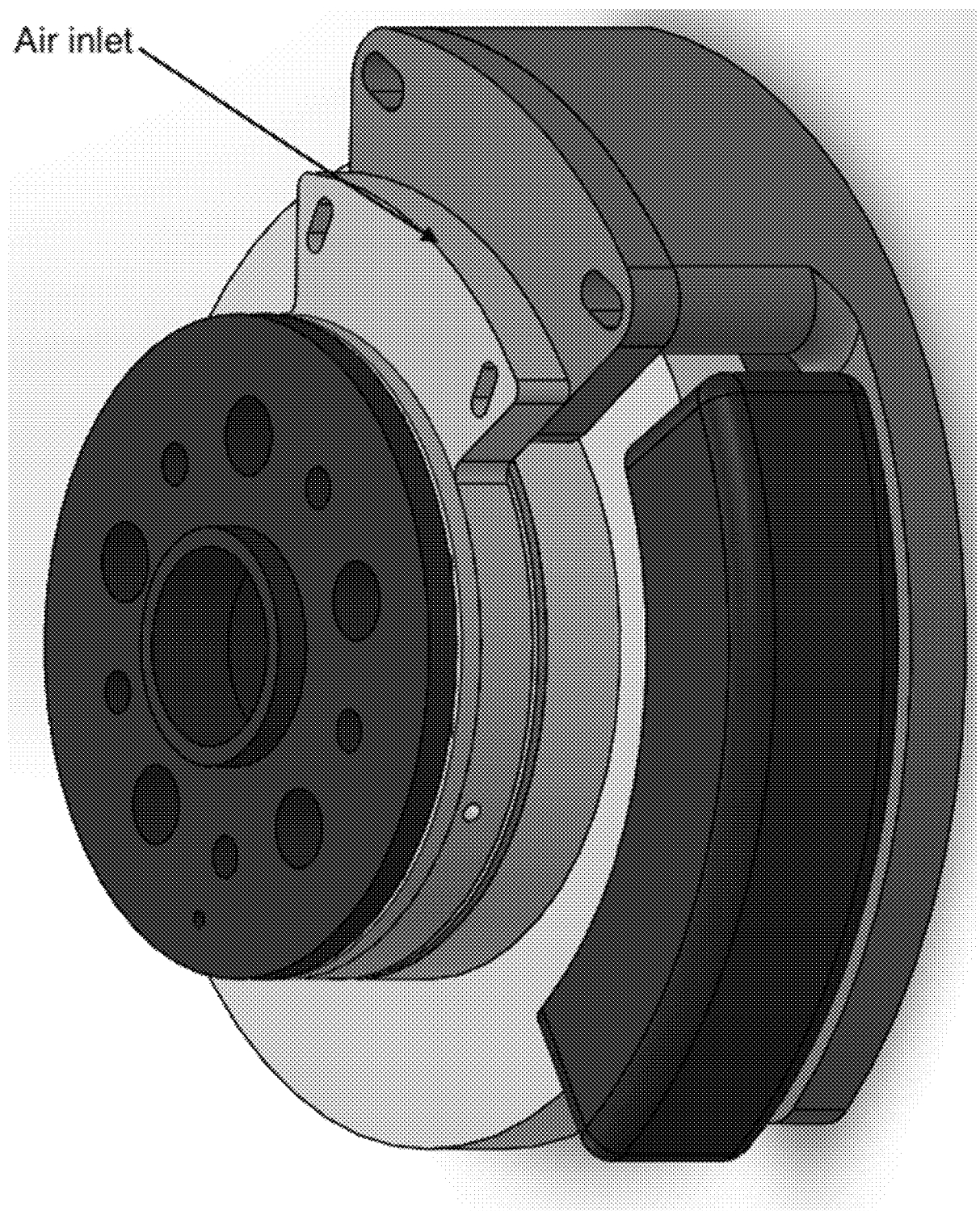
FIG. 22 shows a depiction of an air spacer device disposed on a wheel hub in accordance with an exemplary embodiment of the present invention.
Figure 23:
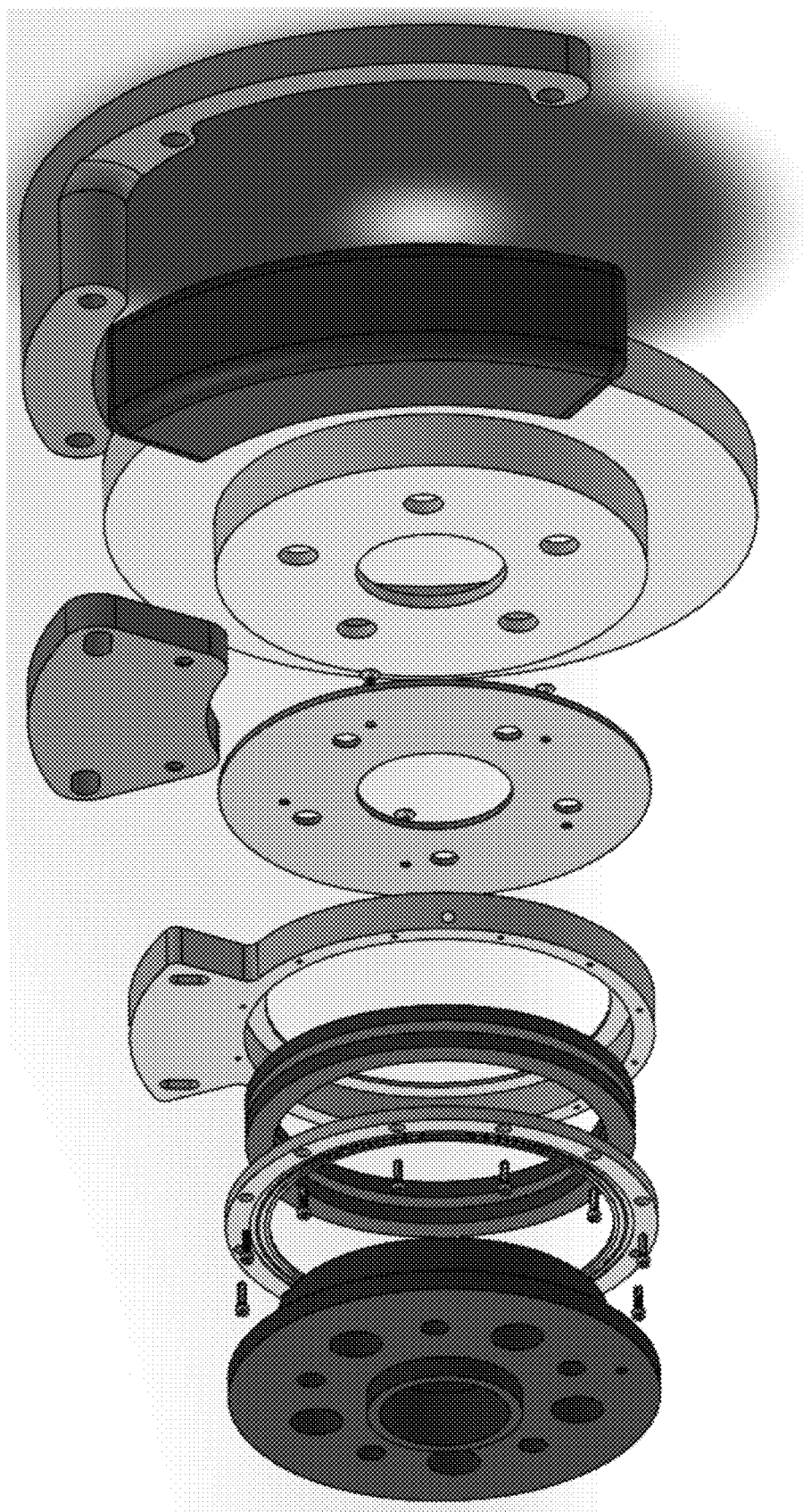
FIG. 23 shows an exploded view depicting an air spacer device in accordance with an exemplary embodiment of the present invention.
Figure 24:
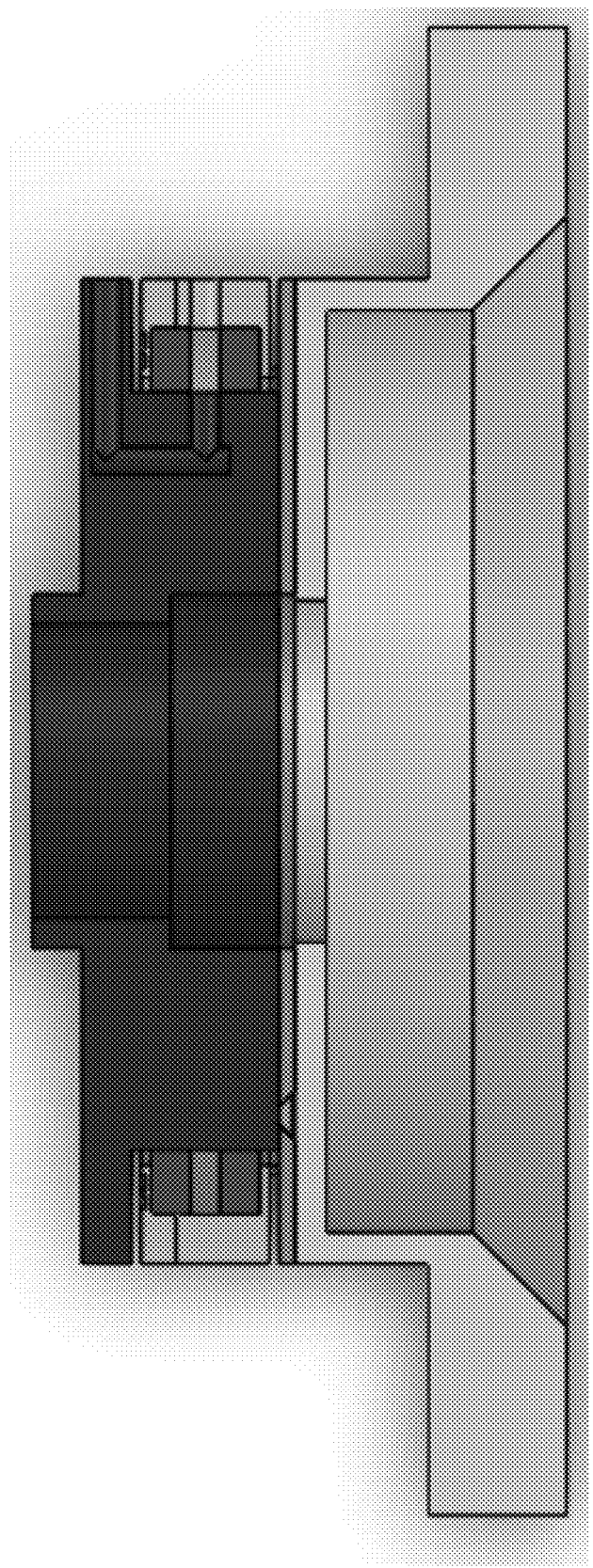
FIG. 24 shows a cross section view depicting an air spacer device in accordance with an exemplary embodiment of the present invention.
Figure 25:
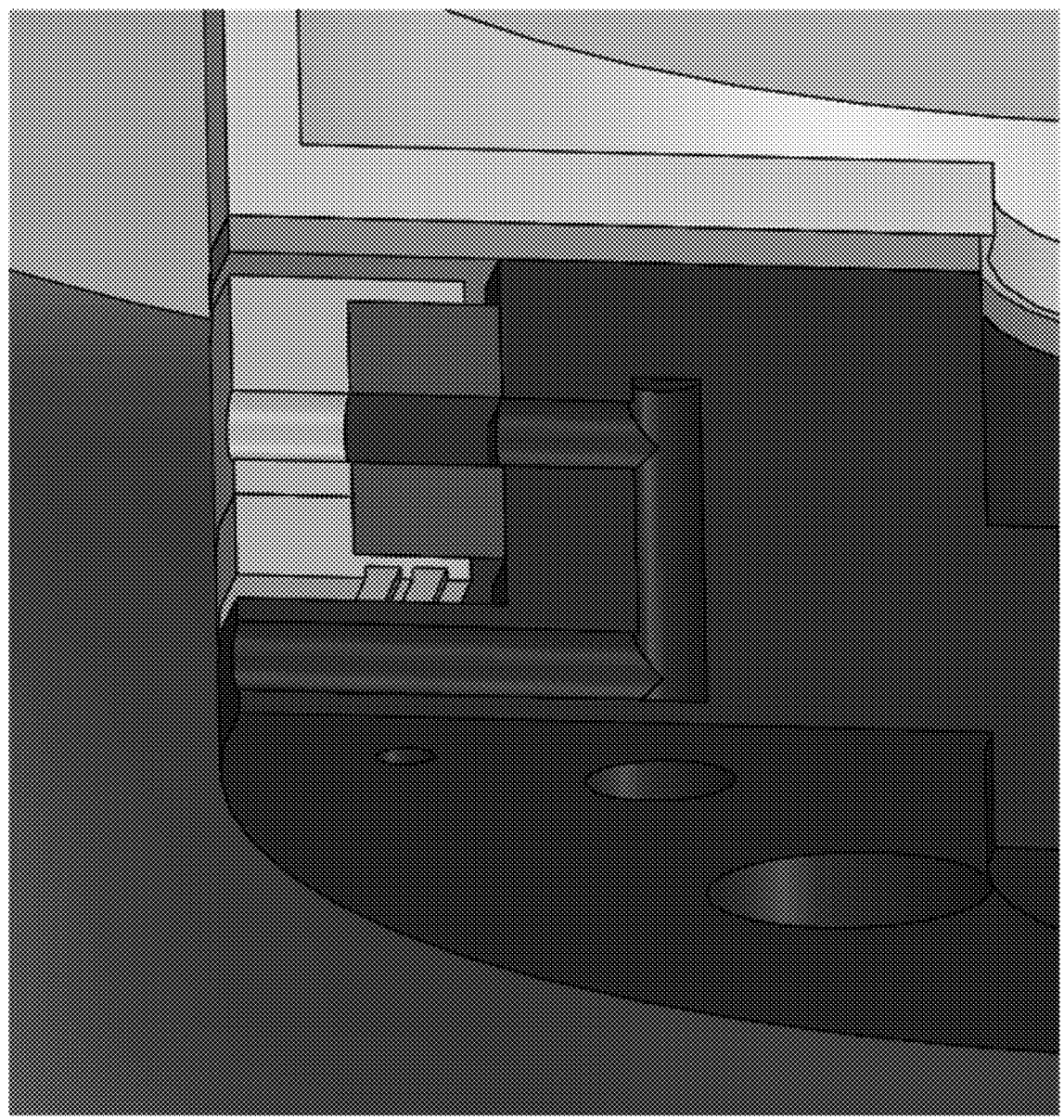
FIG. 25 shows a cross section view depicting an air spacer device in accordance with an exemplary embodiment of the present invention.
Figure 26:
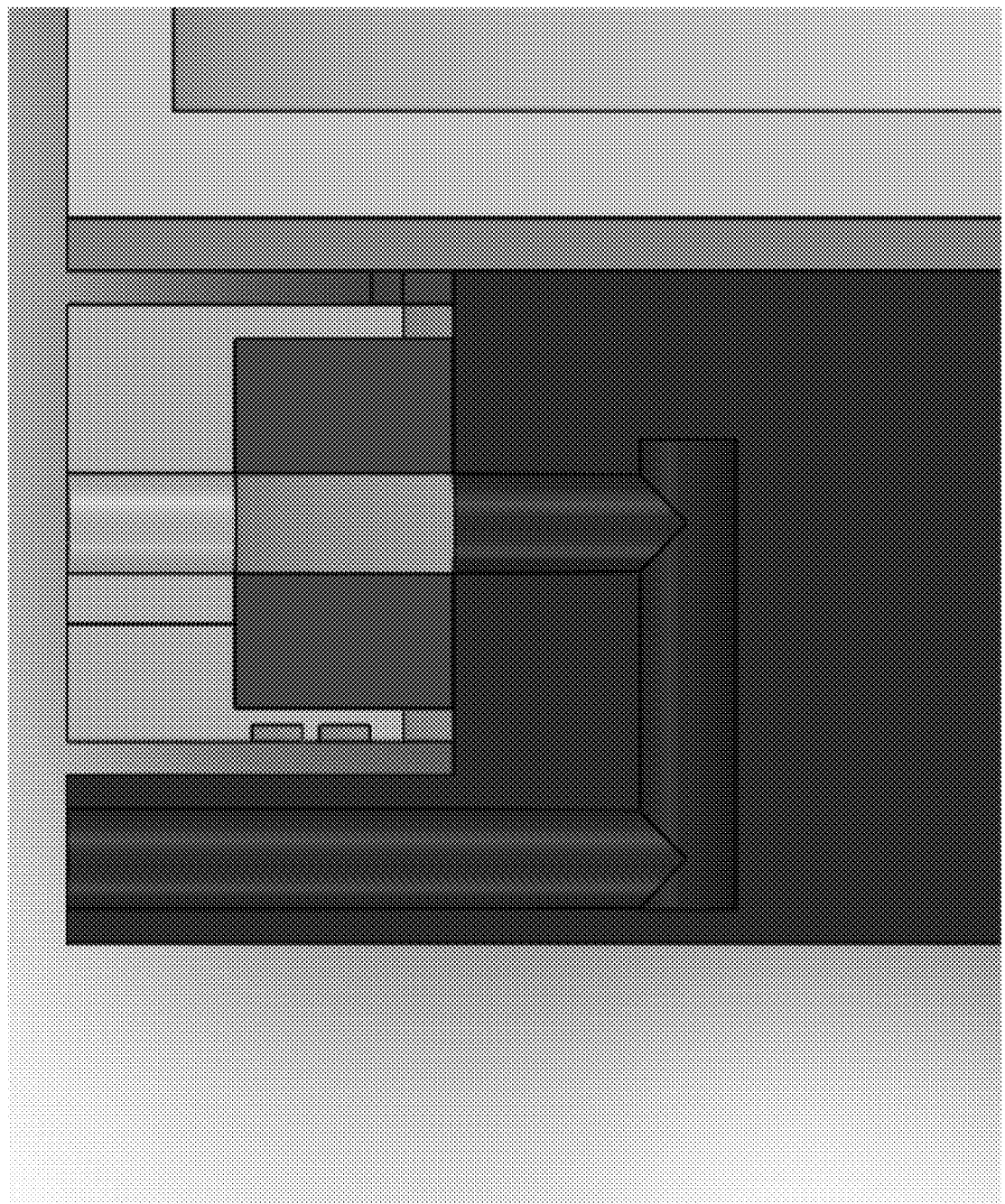
FIG. 26 shows a cross section view depicting an air spacer device in accordance with an exemplary embodiment of the present invention.

As shown in FIGS. 20-22, a first portion of the at least one mount, bracket, or adapter can be attached to a portion of the vehicle, and a second portion of the at least one mount, bracket, or adapter can be connected to the mounting portion of the ring plate. In some aspects, the second portion of at least one mount, bracket, or adapter can be connected to the mounting portion of the ring plate using a connecting plate like the one shown in FIG. 20. In further aspects, the central ring plate can connect to a valve, which can then be connected to a central compressor that is the source of pressurized air for the air wheel spacer.

In various aspects, and as shown in FIGS. 23-26, the coupled first and second plates are configured to be in communication with the ring plate when assembled. In further aspects, the coupled plates are configured to be in electrical and/or mechanical communication with the ring plate. In still further aspects, the second portion of the first plate is configured to be disposed within the interior space defined by the second edge of the ring plate. In even further aspects, the hub assembly is configured to be airtight even while rotating. Thus, the hub assembly can comprise at least one seal for facilitating an airtight connection between the outer plate and ring plate. As shown, at least one seal can be disposed on a surface of the interior space of the ring plate. It is noted that this seal or a similar seal may be used in accordance with the aspects illustrated in FIGS. 2-12. In still further aspects, when a portion of a plate is inserted, the seal can force the ring plate into proper alignment. As shown, openings of the air channel of the outer plate and openings of the air channel of the ring plate are configured to align to create an air flow path between the two. Further, an infinite rotating electrical connection can be established between ring plate and outer plate as well.

In further aspects, the disclosed air spacers and systems may comprise different air channel configurations. In still further aspects, the air spacer may comprise multiple air channels within or outside the air spacer components, for example to improve air flow. In some aspects, where a single fitting or single air channel is insufficient to produce the required tire pressure, a plurality of air channels can be incorporated into the air spacer to produce the required air flow and/or tire pressure.

In further aspects, the outer plate has a connection point for air flow and electrical to connect to an inner wheel valve. In still further aspects, from an outer opening on the outer plate, a tube, for example a metal tube, can be connected to a rim air inlet valve. In some aspects, this air inlet valve may not be the tire's valve but rather a custom installed, no loss, quick disconnect valve. In other aspects, a hose can be used to connect to the existing valve stem through the spokes of the wheel.

In various aspects, the disclosed devices and systems comprise at least one compressed or pressurized air source. In further aspects, the air source may be a compressed or pressurized air source capable of producing pressurized air effective to maintain tire pressure at a predetermined level. In yet further aspects, the air source may be a central air supply configured to supply air to the tires to keep them at the proper pressure. In some aspects, the compressed air source can be an air compressor. In other aspects, the compressed air source can be an an-board air compressor (OAC).

In various further aspects, the disclosed systems comprise at least one of: an air treatment system (ATS), a controller, an independent wheel module (IWM), an inner wheel valve (IWV), and wireless device. In still further aspects, the air treatment system (ATS) is configured to condition compressed air utilized by the system. In yet further aspects, the air treatment system (ATS) can comprise at least one of an air filter, an air/oil/water separator, and other off-the-shelf components. In various aspects, device and/or system components may be housed in a casing and/or housing. The casing can be any shape and may be in the shape of a three-dimensional polygon and the casing walls may define an interior space or interior sections for containing the operating elements of the invention. Any other shape (as used herein, the term shape is used in the broad sense of three-dimensional works) may be employed, so long as the shape is large enough and structured so as to be able to contain the various working components of the invention as more fully disclosed below.

In further aspects, pressurized air can be provided by any desired compressed air source such as, for illustrative purposes, an air compressor located within the vehicle. Once pressurized air is activated by providing power to the system, the pressurized air may be constant and continual, or the pressurized air may be intermittent, and cycle on and off at the same or a different speed or frequency. The air source can be any conventional air source or means for producing pressurized air. Non-limiting examples of suitable air sources include an air compressor, various pump, and the like. It is only important that the air source be able to deliver air to the subject tire at a sufficient level to achieve the desired tire pressure.

Advantageously, the invention may include embodiments having different features with respect to the placement and/or mounting location of the air spacer devices in the vehicle. In some embodiments, a user may be able to choose where to position the airs spacer device with respect to his or her wheel and the vehicle. In other embodiments, a user may have limited choice in where to mount the air spacer device. In further aspects, the air spacer device may be fixed or integrated with respect to the vehicle so the user may have little, if any, choice in positioning. Wherever mounted in a vehicle, the position and/or configuration of an air spacer does not interfere with the user's ability to drive the vehicle during use.

In some embodiments, the invention may provide an app on a wireless device configured to communicate with each of the devices and/or system components. In further aspects, each of the air spacer devices may require the appropriate elements to receive, act on the communications from the wireless device, and/or respond to the app with information.

As described in further detail herein, in other embodiments, the devices and/or systems may include a controller or electronic controller module (ECM) to receive the communications from the wireless device, to pass them on as instructions to the systems components, to receive information from the components, and/or to send the information to the app on the wireless device. The controller may include elements to carry out its function. For example, the controller may include a circuit board, sensor, receiver/transmitter, transceiver, and/or antenna for communicating with the wireless device. The controller may include "smart" technology such as a microprocessor, etc. to process and execute the instructions, information, and/or signal received from the control unit or wireless unit or the information received from the device and system components. As another example, the controller may be connected respectively by one or more wires (and/or other transmitters or carriers) to the one or more system components to transmit instructions/information to the system components and/or to receive information from them.

In further aspects, the electronic controller module (ECM) can comprise electronics and wiring for performing system operations. The electronic controller module (ECM) can comprise a distribution block configured to route compressed air to each wheel of the vehicle. In some aspects, the electronic controller module (ECM) can further comprises at least one of: a) a circuit board configured for all system control and functionality including Bluetooth connectivity for end-user system control, b) an air inlet—150 psi regulator, 175 psi relief valve, and c) a pressure sensor—such as a master sensor which can disable the system if inlet pressure is too low, and d) a distribution block—such as a 5 port (1 inlet/4 outlet), or the like.

In still further aspects, the system can comprise a plurality of Independent Wheel Modules (IWMs). An IWM can be configured to be installed at each wheel of the vehicle and/or configured to control air flow in/out of its respective wheel. The IWM can comprise a transceiver and/or receiver configured to capture pressure data from the vehicle's (TPMS) sensor in the wheel. The IWM further can comprise a wired connection between the IWM and ECM configured to allow for control of IWM as well as sending pressure readings to ECM.

In further aspects, the IWM can further comprise a valve system to configured to control air flow at each wheel. The valve system can be configured to allow for one or more of the following air flow paths: Position 1—closed—system idle—no open flow paths in this position, Position 2—ECM to Air Spacer device—opens flow path between ECM and Air Spacer, and Position 3—Air Spacer device to Exhaust— opens flow path between Air Spacer and exhaust port— exhaust port has a one-way passive valve to prevent environmental intrusion from outside the module. In some aspects, the IWM can comprise a pressure sensor configured to monitor pressure within the Air Spacer device while system is idle and, through the ECM, can alert end-user of any possible system issues.

In yet further aspects, the system can comprise a plurality of Inner Wheel Valves (IWVs). The IWV may be configured to be installed into the wheel inside of the spokes. The IWV may be configured to be installed using a new hole drilled in the wheel. In some aspects, this is the only permanent vehicle modification required. The IWV can also comprise a device body configured to be installed from inside the wheel. The IWV can house a normally closed valve that is electrically controlled. The IWV can also comprise a valve stem configured to extend through the wheel barrel and fasten to a wheel with a nut and seal. In various embodiments, the IWV can comprise a connection between the valve stem and air spacer device. This connection can comprise a quick disconnect type fitting. In other embodiments, the connection can comprise both air and electrical connections.

In even further aspects, the IWV valve can comprise at least two positions selected from: normally closed—no air flow in/out of wheel—this is the main fail-safe for any system malfunction; and open—controlled by ECM—when open an air flow path is established between wheel and air spacer. In still further aspects, the system can also comprise one or more pneumatic hoses and connectors, as well as one or more electrical harness and connections as needed. In various aspects, the controller and/or system component(s) may require a power source depending on the configuration and construction. An exemplary power source may be a battery such as a vehicle battery and/or rechargeable battery. Other power source(s) are possible. Any suitable power source may be used.

In further aspects, the device may comprise a plurality of seals. In still further aspects, the plurality of seals can be disposed between the first and second plates and/or within an interior portion of the central ring. In even further aspects, the plurality of seals can be arranged relative to the first and second plates to create a pocket, for example between a first, inner seal and a second, outer seal, or vice versa. In yet further aspects, the formed pocket can be configured to retain a lubricant and can otherwise provide protection from environmental contaminants entering into the device.

In further aspects, the seals utilized in the present invention can comprise any desired seal effective to meet the different pressure, sealing compression, lubricant retention, and/or external contaminant protection requirements of the various parts of the disclosed devices and systems. In still further aspects, the seal may comprise an O-ring, gasket, packing, fitting, sealing gland, sealant, insert, or the like. In yet further aspects, the seal may comprise a X-seal. In some aspects, a X-seal can reduce sealing compression requirements, improve lubricant retention, and/or improve sealing from both inside and outside pressures. In even further aspects, the disclosed devices and systems may utilize various compression technologies for creating a good seal and fit between components when mounted on the vehicle. To this end, the seal may utilize mechanical components and an axial force compression and/or seal comprised of a material which has sufficient compressive properties.

In various aspects, the controller and/or device components may be included in or integrated within various portion of the devices and systems. In further aspects, the device arrangement and construction of the system can be configured to correspond to a number of different vehicle types. In further aspects, the devices can be connected to or otherwise attached to portions of the vehicle corresponding to the wheel well. By way of non-limiting example, FIGS. 13A and 13B show approximate mounting locations of the vehicle where one or more system components can be correspondingly attached to the vehicle. For example, the position of the air spacer devices can be configured or changed with respect to the characteristics of the wheel or vehicle. For example, positions of the mounting can include below and/or above the vehicle hub.

In even further aspects, system may comprise a plurality of air spacer devices. The plurality of air spacer devices may comprise at least two air spacer devices, for example, two, three, four, five, or six air spacer devices, or more. In various aspects, the device and or system can comprise an impact-dampening component or material. In further aspects, the device can utilize the mechanical properties and benefits of the impact-dampening component or material for shock absorption, such as the shock that may be experienced when operating a vehicle with an installed device or system through rough terrain. In still further aspects, the impact-dampening component or material can comprise gels, air, gas, hydraulic, foam, shocks, springs, or a combination thereof or the like.

In further aspects, the device and/or system component characteristics and configuration, such as, for example, size and dimensions, can be configured to adjust for vehicle type and vehicle size, and use, and other factors to achieve optimal load balancing and distribution. In further aspects, features of the device and components may be configured or utilized to set and/or control the air pressure characteristics and/or provide protection from outside dirt and debris.

In further aspects, one or more component surfaces may comprise a surface finish or machine texture, or the like. In still further aspects, surface of the plate or disk, and/or ring plate may comprise a surface finish or machine texture. In yet further aspects, the rotating component surfaces may comprise a surface finish or machine texture. In even further aspects, the surface finish or machine texture can be configured to aid in ejecting/pumping dirt and debris outward when in the component is in rotation. In some aspects, the surface finish or machine texture may comprise opposing spirals.

In further aspects, the disclosed devices and systems may further comprise at least one emergency pressure relief valve. In still further aspects, the relief valve may be configured to prevent accidental over inflation of a tire by the system. To this end, the relief valve can be located near the tire itself, for example, downstream from the compressor between the air spacer and the tire. In some aspects, the emergency pressure relief valve may comprise a passive, high-pressure relief valve.

In further aspects, while the air spacer devices described herein can be permanently mounted in or on a vehicle or vehicle structure, this is not a requirement. For example, the air spacer devices can be connected to an adapter configured to be removably mounted to a vehicle, e.g., to allow interchange and/or replacement of the air spacer devices. Such configurations allow users, purchasers, retailers, or others to repair or replace defective or damaged devices and/or system components. Components for sensors, controller, such as a printed circuit board and the programming to accomplish the disclosed activities and others, and elements such as timing elements, sound elements and lights, are known, and can be selected or commercially acquired by those of skill in the art. Wires for connecting the elements within the system components or on the surface are contemplated by the present invention.

A number of system components may be mounted within an interior portion of the vehicle. In some aspects, the system components may be configured in a distributed control configuration. In other aspects, the system components may be configured in a centralized control configuration. In some embodiments, the internal components of the system may be configured such that the controller, along with a processing unit (which may have an integrated communication module), air source, air inlet, and distribution block may be located in one portion of the vehicle in operable communication and configured to control multiple air spacer devices located in a remote part of the vehicle. In other aspects, each air spacer devices may comprise its own controller and/or air source.

In various aspects, the components of the disclosed devices and systems can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like.

In a still further aspect, the device and system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

According to various aspects of the disclosure, the devices and systems of the present invention provides a number of advantages over current options. Current CTIS systems often require specific axles and suspension setups. In some on-board air systems, the hoses must be attached to a stationary vehicle around the outside of the tire. In other on-board air systems, an externally mounted hub utilized to allows the vehicle to be driven with hoses attached around the outside of the tire. The present devices and systems can be bolted-on and requires little or no vehicle modification.

In further aspects, application software (an app) on a wireless device such as a mobile phone may be used to activate and de-activate and/or otherwise control the tire pressure level. In yet further aspects, the disclosed devices may be equipped with wireless technology to communicate with the app on the wireless device. In even further aspects, the app may provide at least one of: a graphic image of the specific wheel and/or tire to indicate where (and/or other characteristics of the tire pressure) the device(s) are delivering air to the vehicle's tire at the time of operation, wheel locations to indicate where (and/or other characteristics of the pressure) the device(s) may be made to deliver air, monitoring and/or status data received from the sensors in the devices and/or tires.

Figure 14:
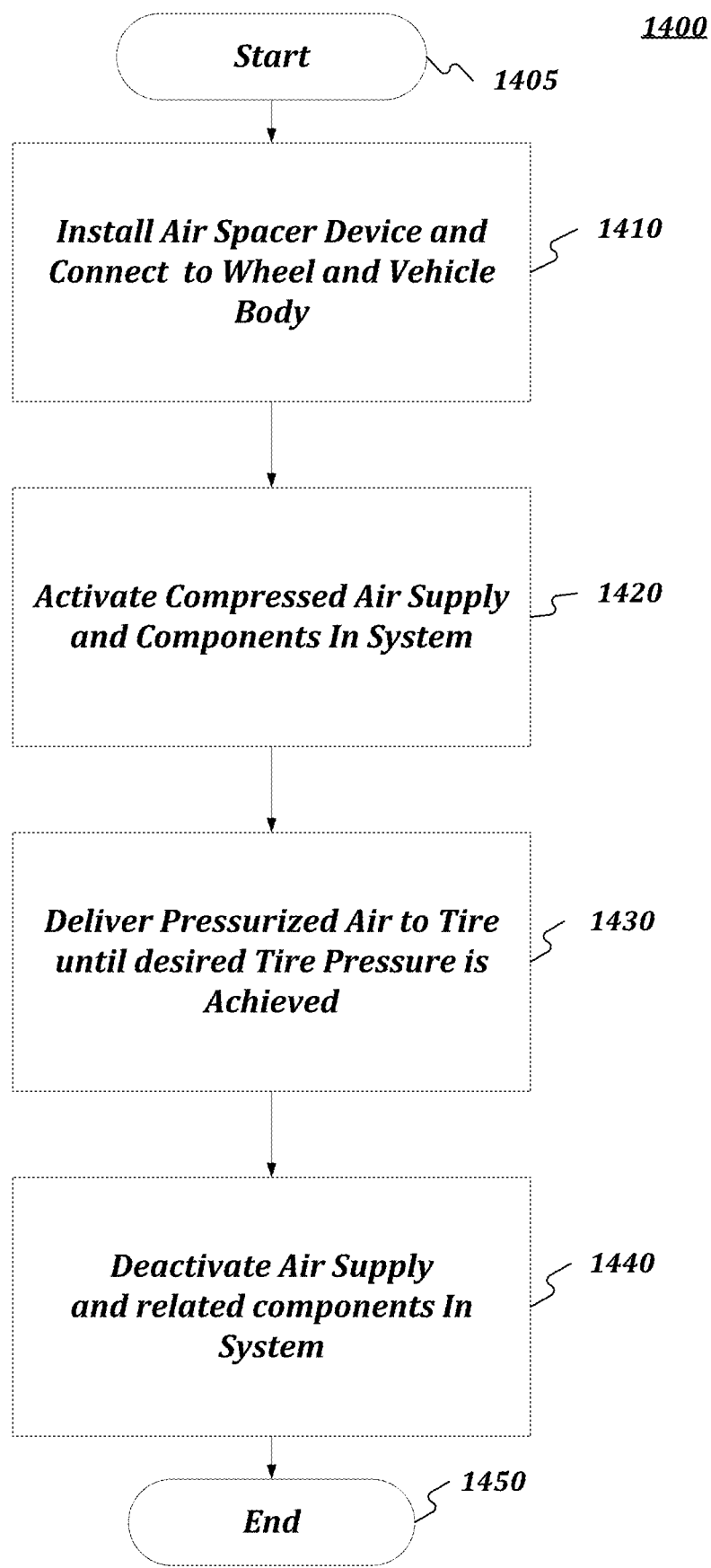
FIG. 14 is a flowchart of a method for using the disclosed devices and systems, in accordance with another exemplary embodiment of the present invention.

Also disclosed herein are methods of using the disclosed devices and systems. For example, in another exemplary aspect, the present disclosure provides a method for continuous controlling tire pressure using a disclosed device or system. In further aspects, FIG. 14 is a flow chart setting forth the general stages involved in a method 1400 consistent with an embodiment of the disclosure for operating the disclosed devices and systems. Method 1400 may be implemented using, at least in part, a controller 1500 (e.g., on-board computing device) as described in more detail below with respect to FIG. 15. Controller 1500 may comprise a controller for operating the devices and/or system components as well as performing other operational tasks, including, but not limited to, delivering pressurized air, tire pressure control and parameters, and communication. As such, controller 1500 may be in operative configuration and communication with, for example, but not be limited to, air spacer, air compressor, air treatment system (ATS), independent wheel module (IWM), inner wheel valve (IWV), distribution valve manifold (DVM), user control module (UCM), electronic controller module (ECM), wireless pressure sensors (WPS), communication module, power source, power regulator, pressure sensors, distribution block, various telemetry sensors, transceivers and antennas. As will be detailed with reference to FIG. 15, controller 1500 may comprise a remote communication module to enable remote operation as described herein. In other embodiments, controller 1500 may be completely self-operating upon configuration. In still further aspects, controller 1500 may operate as user control module 110.

Furthermore, although stages are disclosed with reference to controller 1500, it should be understood that a plurality of other components may enable the operation of method 1400, including, but not limited to, other computing components, mechanical components, environment properties (e.g., temperature, pressure, etc.), user conditions, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1400 may begin at starting block 1405 and proceed to stage 1410, where the air spacer device and system components may be installed in connection with a wheel of a vehicle. From stage 1410, where the air spacer device is positioned on the vehicle wheel, method 1400 may proceed to stage 1420 where the air spacer device, air compressor, and/or other components, such as sensors, may be activated. The activation of device and/or system components, though disclosed in a particular order for illustrative purposes, may occur in other arrangements. Upon activation, pressurized air from the air compressor may be delivered to one or more air spacer devices. In some aspects, the wheels of a vehicle may require balancing after installing the air spacer and/or IWV, for example, by counterbalancing.

In various aspects, an advantage of the invention can be that it allows a user to activate or otherwise deliver air to the air spacer devices remotely from the wheel while in motion. In further aspects, a vehicle operator does not have to get out of the vehicle to: activate its operation, to shut off operation, and/or to adjust the tire pressure level. In still further aspects, a user may activate or de-activate (and/or otherwise control operation of) the air space devices and system by using a control unit, such as a wireless device or mobile device that is in operative communication with the air spacer devices of the system. The wireless device may be a device that may be used for additional purposes other than use with the invention such as a mobile phone, tablet computer, notebook computer, desktop computer, etc. In an embodiment, the invention may provide a specialized wireless device specifically configured for use with the invention and may be installed in the vehicle cabin. The specialized wireless device may include other uses, if its use is not limited to this particular embodiment of the invention.

As provided in more detail herein, the control unit used to control the air spacer devices of the system may include an application or application software (an "app") specifically created for such usage. Advantageously, the user may download and/or otherwise obtain the app from sources that supply apps such as independent developers and app stores. The app as used with embodiments of the invention communicates wirelessly, such as by using Bluetooth or the like technology.

Controller 1500 (e.g., on-board computing-device) may automatically activate device elements and/or components instantly or after a set amount of time has passed since the launch. In other embodiments, activation may occur upon certain reading from on-board sensors (e.g., including, but not limited to, sensors deployed in the wheels and/or tire). For example, activation of one or more device elements may be dependent on certain environmental factors and/or user conditions such as, for example, temperature, tire pressure, acceleration, and the like. Controller 1500 may be configured to trigger activation of various device components upon the satisfaction of certain pre-set conditions. Such conditions may be defined prior to activation.

From stage 1420, where the device and system components are activated, method 1400 may proceed to stage 1430, where delivery of pressurized air may be maintained at a specific wheel for a time sufficient to meet predetermined criteria, such as a minimum tire pressure. From stage 1430, where the device is used to adjust tire pressure, method 1400 may proceed to stage 1440, where the corresponding device components (i.e., components involved in delivering air) are turned off. After stage 1440, method 1400 may end at stage 1450.

During all stages of the various methods, the device and system may be in operable communication with the user via antenna or wireless communication component. The user may receive various readings from the various device components. In some embodiments, the user may control the operation of the air spacer devices and system during use. For example, the user may be able to control the device and system components, including, but not limited to, air spacer, air compressor, air treatment system (ATS), independent wheel module (IWM), inner wheel valve (IWV), electronic controller module (ECM), communication module, power source, power regulator, pressure sensors, distribution block, various telemetry sensors, transceivers and antennas. In some embodiments, the disclosed devices and system may comprise a shutoff switch for controlling one or more portions of the system. For example, the system may comprise a mechanical shutoff switch for controlling some or all components connected to the electrical system, such as, the portion of the system distributing power to the IWV. In yet further aspects, the shutoff switch may be configured to prevent unintentional tire deflation while in motion, for example, if an errant signal were generated and transmitted to the IWV (e.g., via static build up, static shock when entering or exiting vehicle, lighting strike).

In other embodiments, controller 1500 may be pre-configured with operational control instructions and/or data. In further aspects, embodiments of the device and system may be used for a number of different vehicle applications.

In various aspects, the disclosed devices and systems may comprise, but not be limited to, an integrated controller and/or on-board computing module. The computing module may be in operative configuration and communication with, for example, but not be limited to, air spacer, air compressor, air treatment system (ATS), independent wheel module (IWM), inner wheel valve (IWV), electronic controller module (ECM), communication module, power source, power regulator, pressure sensors, distribution block, various telemetry sensors, transceivers and antennas. Further, the computing module may be in operative communication with another computing device consistent with the description herein, and may comprise, but not be limited to, a wireless device, smart phone, desktop computer, laptop, a tablet, or mobile telecommunications device. Such remote devices may be used to control and/or configure integrated computing module (e.g., activation conditions, operating parameters and settings, and the like).

Moreover, the system may be in operative communication with a centralized server, such as, for example, a cloud computing service. Although operation has been described to be performed, in part, by a controller 1500, it should be understood that, in some embodiments, different operations may be performed by different networked elements in operative communication with controller 1500. In further aspects, embodiments of the present disclosure may comprise a system having a memory storage and a processing unit. The processing unit may be coupled to the memory storage, wherein the processing unit is configured to perform the stages of method 1400.

Figure 15:
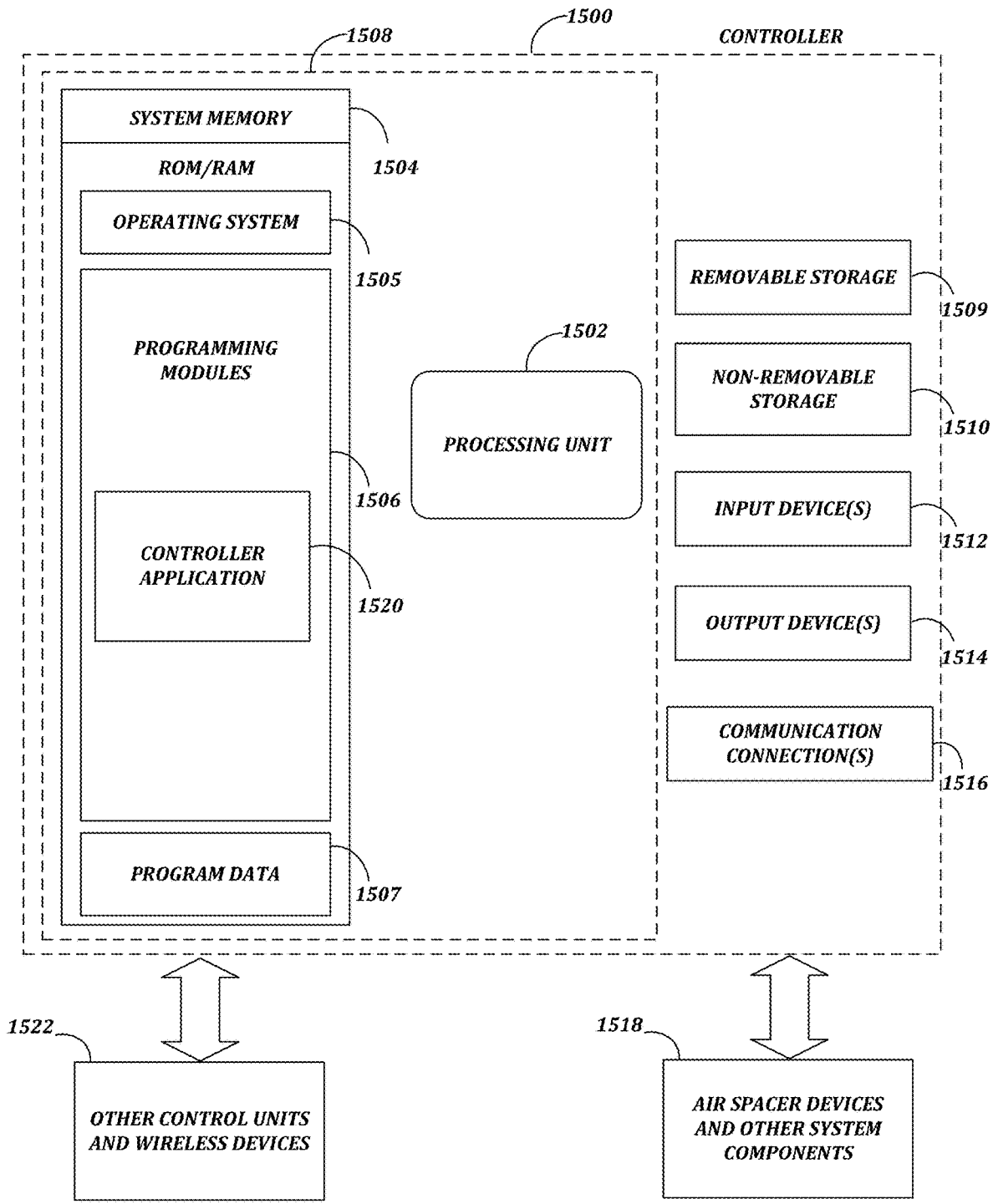
FIG. 15 is a diagram of a system including a computing device for enabling operation of the disclosed devices and systems, in accordance with another exemplary embodiment of the present invention.

FIG. 15 is a block diagram of a system including controller 1500. Consistent with an embodiment of the disclosure, the aforementioned memory storage and processing unit may be implemented in a computing device, such as controller 1500. Any suitable combination of hardware, software, or firmware may be used to implement the memory storage and processing unit. For example, the memory storage and processing unit may be implemented with controller 1500 or any of air spacer devices and system components 1518, or any other control unit and wireless devices 1522, in combination with controller 1500. Other air spacer devices and system components 1518 may comprise, for example, but not be limited to, control mechanisms, sensors, pressure elements, thermal elements, activating switch, communication module, power source, power regulator, various telemetry sensors, transceivers and antennas. The aforementioned system, device, and processors are examples and other systems, devices, and processors may comprise the aforementioned memory storage and processing unit, consistent with embodiments of the disclosure.

With reference to FIG. 15, a system consistent with an embodiment of the disclosure may include a computing device, such as controller 1500. In a basic configuration, controller 1500 may include at least one processing unit 1502 and a system memory 1504. Depending on the configuration and type of computing device, system memory 1504 may comprise, but is not limited to, volatile (e.g., random-access memory (RAM)), non-volatile (e.g., read-only memory (ROM)), flash memory, or any combination. System memory 1504 may include operating system 1505, one or more programming modules 1506, and may include a program data 1507. Operating system 1505, for example, may be suitable for controlling controller 1500's operation. In one embodiment, programming modules 1506 may include controller application ("app") 1520. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Advantageously, the app may provide a user with information as well as be the user's interface to operating the embodiment of the invention. The app may include one or more graphic user interfaces (GUIs). Among the GUIs of the app may be a GUI allowing the user to pick which, if there is more than one, air spacer device and/or system element to activate, and to select (if available) one or more operating parameters or characteristics (such as tire pressure or fill speed) of the air spacer device(s). The user may be able to adjust such selections without having to deactivate the embodiment from a GUI of the app. The user may also use the app to turn on and turn off the device components.

Another advantage of the app is that the app may present the user with a GUI that depicts the user's vehicle (or a generic vehicle) and shows where the air is being delivered. The GUI may include additional or other information relating to the pressurized air being applied such as speed or volume. The additional or other information may be color coded and/or otherwise presented so as to be readily understood by the user by looking at the GUI of the app. The app may also present the user with information received from the device components, such as environmental and telemetry data and tire status or condition.

Controller 1500 may have additional features or functionality. For example, controller 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by controller 1500. Any such computer storage media may be part of device 1500. Controller 1500 may also be operative with input device(s) 1512 such as a keyboard, a mouse, a pen, a sound input device, a touch input device, etc. Input device(s) 1512 may be used to, for example, manually access and program controller 1500. Output device(s) 1514 such as a display, speakers, a printer, etc. may also be included. The aforementioned devices are examples and others may be used.

Controller 1500 may also contain a communication connection 1516 that may allow device 1500 to communicate with other control units and wireless devices 1522 as well as air spacer devices and other system components 1518 (e.g., transceivers, sensors, thermal elements), such as over an encrypted network in a distributed computing environment. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, Bluetooth, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., air spacer controller application 1520) may perform processes including, for example, one or more of stages or portions of stages of method 1400 as described above. App 1520 may be configured to operate device components 1518 and receive instructions from, for example, communications connections module 1516. The aforementioned process is an example, and processing unit 1502 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Generally, as disclosed herein, a plurality of aspects is associated with this disclosure. Aspect 1 includes a device for continuously controlling tire pressure, the device comprising: a bracket configured to be fixedly attached to a mounting point on a vehicle, the mounting point associated with a tire of the vehicle; a fixed non-rotating member fixedly attached to the bracket, the fixed non-rotating member having at least one first seal surface, the at least one seal surface configured to be in fluid communication with a compressed air source; and a non-fixed rotating member rotatably attached to the fixed non-rotating member, the non-fixed rotating member being configured to rotate with the tire and having at least one second seal surface, wherein an air chamber defined within a volume between interacting the at least one first seal surface and the at least one second seal surface causes fluid communication between an interior space of the tire and the compressed air source.

Aspect 2 includes the device of any preceding aspect, further comprising at least one bearing arranged between the fixed non-rotating member and the non-fixed rotating member, the bearing being configured to maintain alignment of the device.

Aspect 3 includes the device of any preceding aspect, wherein the bracket is configured to fixedly mount to a brake caliper or axle of the vehicle.

Aspect 4 includes the device of any preceding aspect, further comprising the compressed air source, wherein the compressed air source includes an on-board compressor.

Aspect 5 includes the device of any preceding aspect, wherein the compressed air source further includes an air or gas treatment system.

Aspect 6 includes the device of any preceding aspect, wherein the compressed air source further includes a compressed air tank.

Aspect 7 includes the device of any preceding aspect, wherein the fixed non-rotating member comprises at least one threaded mounting hole configured to retain the fixed-non-rotating member mounted to the vehicle.

Aspect 8 includes the device of any preceding aspect, wherein the non-fixed rotating member comprises a plurality of apertures configured to facilitate mounting of the tire.

Aspect 9 includes the device of any preceding aspect, wherein the plurality of apertures numbers twice as many as tire lug bolts for a single tire.

Aspect 10 includes the device of any preceding aspect, wherein a first half of the plurality of apertures is configured to receive the tire lug bolts, and wherein a second half of the plurality of apertures is configured to attach the tire to the non-fixed rotating member.

Aspect 11 includes a system for retrofitting a vehicle to have continuously controlled tire pressure, the system comprising: a controller configured to facilitate the control of tire pressure at a first tire associated with the vehicle; and a first device for continuously controlling tire pressure, the first device being controlled through the controller and comprising: a fixed non-rotating member fixedly attached to the vehicle, the fixed non-rotating member having at least one first seal surface, the at least one seal surface configured to be in fluid communication with a compressed air source; and a non-fixed rotating member rotatably attached to the fixed non-rotating member, the non-fixed rotating member being configured to rotate with the tire and having at least one second seal surface, wherein an air chamber defined within a volume between interacting the at least one first seal surface and the at least one second seal surface causes fluid communication between an interior space of the tire and the compressed air source.

Aspect 12 includes the system of any preceding aspect, further comprising at least one bearing arranged between the fixed non-rotating member and the non-fixed rotating member, the bearing being configured to maintain alignment of the device.

Aspect 13 includes the system of any preceding aspect, a bracket assembly configured to fixedly mount the fixed non-rotating member to a brake caliper or axle of the vehicle.

Aspect 14 includes the system of any preceding aspect, further comprising the compressed air source, and wherein the compressed air source comprises an on-board compressor and an air treatment system.

Aspect 15 includes the system of any preceding aspect, further comprising a distribution valve manifold in fluid communication with the fixed non-rotating member and the compressed air source, the distribution valve manifold being further in electrical communication with the controller, the distribution valve manifold being configured to distribute air to the first device for continuously controlling tire pressure.

Aspect 16 includes the system of any preceding aspect, further comprising a wireless tire pressure monitor associated with the first tire, the wireless tire pressure monitor configured to send tire pressure data related to the first tire to the controller.

Aspect 17 includes the system of any preceding aspect, wherein the non-fixed rotating member comprises a plurality of apertures configured to facilitate mounting of the first tire.

Aspect 18 includes the system of any preceding aspect, wherein the plurality of apertures numbers twice as many as tire lug bolts for a single tire.

Aspect 19 includes the system of any preceding aspect, wherein a first half of the plurality of apertures is configured to receive the tire lug bolts, and wherein a second half of the plurality of apertures is configured to attach the tire to the non-fixed rotating member.

Aspect 20 includes the system of any preceding aspect, further comprising three additional devices for continuously controlling tire pressure at three additional tires of the vehicle.

Aspect 21 includes a device for continuously controlling tire pressure, the device comprising: a) a hub assembly comprising: i) a first outer plate having: 1. a first edge defining a first circumference of a first portion of the first plate, 2. a second recessed edge defining a second circumference of a second portion of the first plate, and 3. an air channel having a first opening disposed on a surface of the first edge and a second opening disposed on a surface of the second edge, the air channel extending between the first and second openings; ii) a second inner plate having a first edge defining a first circumference of the second plate, the second plate being configured to couple to the first plate, the coupled plates being configured to attach to and rotate with a wheel of a vehicle; and iii) a central ring plate having a first outer edge defining a first circumference, a second inner edge defining a second circumference, and an air channel having a first opening disposed on a surface of the first edge and a second opening disposed on a surface of the second edge, the air channel extending between the first and second openings, the ring plate being configured to connect to a portion of the vehicle; wherein the coupled plates are configured to be in communication with the ring plate; and b) a compressed or pressurized air source capable of producing pressurized air effective to maintain tire pressure at a predetermined level.

Aspect 22 includes the device of any preceding any preceding aspect, wherein the coupled plates are configured to be in electrical and/or mechanical communication with the ring plate.

Aspect 23 includes the device of any preceding any preceding aspect, wherein the second portion of the first plate is configured to be disposed within the second edge of the ring plate.

Aspect 24 includes the device of any preceding any preceding aspect, wherein the ring plate comprises a mounting portion configured to connect to a portion of the vehicle.

Aspect 25 includes the device of any preceding any preceding aspect, wherein the mounting portion comprises a plurality of apertures for adjustably attaching to a plurality of mounting locations on the vehicle.

Aspect 26 includes the device of any preceding any preceding aspect, wherein the mounting portion comprises a planar plate section extending out from an outermost edge of the ring plate.

Aspect 27 includes the device of any preceding any preceding aspect, wherein the ring plate is connected to the vehicle using at least one of a mount, bracket, connector, or adapter.

Aspect 28 includes the device of any preceding any preceding aspect, wherein a first portion of the at least one mount, bracket, or adapter is attached to a portion of the vehicle, and wherein a second portion of the at least one mount, bracket, or adapter is connected to the mounting portion of the ring plate.

Aspect 29 includes the device of any preceding any preceding aspect, wherein the second portion of the at least one mount, bracket, or adapter is connected to the mounting portion of the ring plate using a connecting plate.

Aspect 30 includes the device of any preceding any preceding aspect, wherein the second (inner) edge of the ring plate defines an interior space for containing the second portion of the first plate.

Aspect 31 includes the device of any preceding any preceding aspect, wherein the hub assembly comprises at least one seal.

Aspect 32 includes the device of any preceding any preceding aspect, wherein the at least one seal is disposed on a surface of the interior space the ring plate.

Aspect 33 includes the device of any preceding any preceding aspect, wherein the air channel comprises an air inlet and air outlet.

Aspect 34 includes the device of any preceding any preceding aspect, wherein the compressed air source is an air compressor.

Aspect 35 includes the device of any preceding any preceding aspect, wherein the compressed air source is an an-board air compressor (OAC).

Aspect 36 includes a system for continuously controlling tire pressure, the system comprising: a) a device of any preceding any preceding aspect; and b) one or more system component selected from: i) an air treatment system (ATS), ii) a controller, iii) an independent wheel module (IWM), iv) an inner wheel valve (IWV), and v) wireless device.

Aspect 37 includes the system or device of any preceding any preceding aspect, wherein the air treatment system (ATS) is configured to condition compressed air utilized by the system.

Aspect 38 includes the system or device of any preceding any preceding aspect, wherein the air treatment system (ATS) comprises at least one of an air filter and/or an air/oil/water separator.

Aspect 39 includes the system of any preceding any preceding aspect, wherein the controller comprises electronic controller module (ECM).

Aspect 40 includes the system or device of any preceding any preceding aspect, wherein the electronic controller module (ECM) comprises electronics and wiring for perform system operations.

Aspect 41 includes the system or device of any preceding any preceding aspect, wherein the controller comprises electronic controller module (ECM) comprises a distribution block configured to route compressed air to each wheel of the vehicle.

Aspect 42 includes the system or device of any preceding any preceding aspect, wherein the electronic controller module (ECM) further comprises at least one of: a) a circuit board configured for all system control and functionality including Bluetooth connectivity for end-user system control, b) an air inlet—150 psi regulator, 175 psi relief valve, and c) a pressure sensor—such as a master sensor which can disable the system if inlet pressure is too low, and d) a distribution block—such as a 5 port (1 inlet/4 outlet).

Aspect 43 includes the system or device of any preceding any preceding aspect, wherein the ECM comprises a housing for containing one or more components.

Aspect 44 includes the system or device of any preceding any preceding aspect, wherein the system comprises a plurality of Independent Wheel Modules (IWMs).

Aspect 45 includes the system or device of any preceding any preceding aspect, wherein an IWM is configured to be installed at each wheel of the vehicle.

Aspect 46 includes the system or device of any preceding any preceding aspect, wherein an IWM is configured to control air flow in/out of its respective wheel.

Aspect 47 includes the system or device of any preceding any preceding aspect, wherein the IWM comprises a transceiver and/or receiver configured to capture pressure data from the vehicle's (TPMS) sensor in the wheel.

Aspect 48 includes the system or device of any preceding any preceding aspect, wherein the IWM further comprises a wired connection between the IWM and ECM configure to allow for control of IWM as well as sending pressure readings to ECM.

Aspect 49 includes the system or device of any preceding any preceding aspect, wherein the IWM further comprises a valve system to configured to control air flow at each wheel.

Aspect 50 includes the system or device of any preceding any preceding aspect, wherein the valve system is configured to allow for one or more of the following air flow paths: a) Position 1—closed—system idle—no open flow paths in this position, b) Position 2—ECM to Air Spacer device—opens flow path between ECM and Air Spacer c) Position 3—Air Spacer device to Exhaust—opens flow path between Air Spacer and exhaust port—exhaust port has a one-way passive valve to prevent environmental intrusion from outside the module.

Aspect 51 includes the system of any preceding any preceding aspect, wherein the IWM comprises a housing for containing one or more components.

Aspect 52 includes the system or device of any preceding any preceding aspect, wherein the IWM housing is configured to withstand the harsh environment expected with waterproof electrical connections.

Aspect 53 includes the system or device of any preceding any preceding aspect, wherein the IWM comprises a pressure sensor configured to monitor pressure within the Air Spacer device while system is idle and, through the ECM, can alert end-user of any possible system issues.

Aspect 54 includes the system or device of any preceding any preceding aspect, wherein the system comprises a plurality of Inner Wheel Valves (IWVs).

Aspect 55 includes the system of any preceding any preceding aspect, wherein the IWV is configured to be installed into the wheel inside of the spokes.

Aspect 56 includes the system or device of any preceding any preceding aspect, wherein the IWV is configured to be installed using a new hole drilled in the wheel. This is the only permanent vehicle modification required.

Aspect 57 includes the system or device of any preceding any preceding aspect, wherein the IWV comprises a device body configured to be installed from inside the wheel.

Aspect 58 includes the system or device of any preceding any preceding aspect, wherein the IWV houses a normally closed valve that is electrically controlled.

Aspect 59 includes the system or device of any preceding any preceding aspect, wherein the IWV comprises a valve stem configured to extend through the wheel barrel and fasten to a wheel with a nut and seal.

Aspect 60 includes the system or device of any preceding any preceding aspect, wherein the IWV comprises a connection between the valve stem and air spacer device.

Aspect 61 includes the system or device of any preceding any preceding aspect, wherein the connection can comprise a quick disconnect type fitting.

Aspect 62 includes the system or device of any preceding any preceding aspect, wherein the connection comprises air and electrical connections.

Aspect 63 includes the system or device of any preceding any preceding aspect, wherein the IWV valve comprises at least two positions selected from: a) normally closed—no air flow in/out of wheel—this is the main fail-safe for any system malfunction, and b) open—controlled by ECM—when open an air flow path is established between wheel and air spacer.

Aspect 64 includes the system of any preceding any preceding aspect, wherein the system comprises one or more pneumatic hoses and connectors.

Aspect 65 includes the system of any preceding any preceding aspect, wherein the system comprises one or more electrical harness and connections as needed.

Aspect 66 includes the system of any preceding any preceding aspect, wherein the controller is communicatively connected to one or more of: an air treatment system (ATS), a pressurized air source, an air spacer device, an independent wheel module (IWM), and an inner wheel valve (IWV), and wherein the controller is configured to control operation of the one or more air treatment system (ATS), air spacer device, independent wheel module (IWM), and inner wheel valve (IWV) based on instructions regarding operation of the one or more air treatment system (ATS), a pressurized air source, air spacer device, an independent wheel module (IWM), and an inner wheel valve (IWV).

Aspect 67 includes the system of any preceding any preceding aspect, further comprising a control unit communicatively connected to the controller and configured to transmit instructions regarding operation of the one or more air treatment system (ATS), pressurized air source, air spacer device, independent wheel module (IWM), and inner wheel valve (IWV) to the controller.

Aspect 68 includes the system of any preceding any preceding aspect, wherein the control unit comprises a switch in operative communication with the one or more air treatment system (ATS), pressurized air source, air spacer device, independent wheel module (IWM), and inner wheel valve (IWV) for selectively activating the one or more air treatment system (ATS), pressurized air source, air spacer device, independent wheel module (IWM), and inner wheel valve (IWV).

Aspect 69 includes the system of any preceding any preceding aspect, wherein the control unit comprises a wireless device having application software configured to transmit instructions regarding the operation of the one or more air treatment system (ATS), pressurized air source, air spacer device, independent wheel module (IWM), and inner wheel valve (IWV) to the controller.

Aspect 70 includes the system of any preceding any preceding aspect, wherein the application software is operational to at least one of: present information regarding the operation of the one or more air treatment system (ATS), pressurized air source, air spacer device, independent wheel module (IWM), and inner wheel valve (IWV) to the user via one or more graphic user interfaces on the wireless device, to receive the instructions from the user, and to transmit the instructions to the controller.

Aspect 71 includes the system of any preceding any preceding aspect, wherein the system comprises end-user control.

Aspect 72 includes the system of any preceding any preceding aspect, wherein the end-user control comprises a smartphone application.

Aspect 73 includes the system or device of any preceding any preceding aspect, wherein the system is configured to connect to a Bluetooth enabled device (i.e., smartphone or tablet) and with the application installed control all aspects of system operation and monitoring as well as receive alerts.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A device for continuously controlling tire pressure, the device comprising:
   a fixed non-rotating member configured to be fixedly attached to a mounting point on a vehicle, the mounting point being associated with a tire of the vehicle, the fixed non-rotating member having at least one first seal surface, the at least one first seal surface configured to be in fluid communication with a compressed air source; and
   a non-fixed rotating member rotatably attached to the fixed non-rotating member, the non-fixed rotating member being configured to rotate with the tire and having at least one second seal surface, wherein an air chamber defined within a volume between the at least one first seal surface and the at least one second seal surface facilitates fluid communication between an interior space of the tire and the compressed air source,
   wherein the non-fixed rotating member comprises a plurality of apertures configured to facilitate mounting of the tire, and wherein a first subset of the plurality of apertures is configured to receive tire lug bolts, and wherein a second subset of the plurality of apertures is configured to attach the tire to the non-fixed rotating member.

2. The device of claim 1, further comprising at least one bearing arranged between the fixed non-rotating member and the non-fixed rotating member, the bearing being configured to maintain alignment of the device.

3. The device of claim 1, wherein the fixed non-rotating member is configured to fixedly mount to a brake caliper or axle of the vehicle.

4. The device of claim 1, further comprising the compressed air source, and wherein the compressed air source includes an on-board compressor.

5. The device of claim 4, wherein the compressed air source further includes an air or gas treatment system.

6. The device of claim 4, wherein the compressed air source further includes a compressed air tank.

7. The device of claim 1, wherein the fixed non-rotating member comprises at least one threaded mounting hole configured to retain the fixed-non-rotating member mounted to the vehicle.

8. The device of claim 1, wherein the plurality of apertures numbers twice as many as tire lug bolts for a single tire.

9. The device of claim 8, wherein the first subset of the plurality of apertures is a first half of the plurality of apertures, and wherein the second subset of the plurality of apertures is a second half of the plurality of apertures.

10. A system for retrofitting a vehicle to have continuously controlled tire pressure, the system comprising:
   a controller configured to facilitate the control of tire pressure at a first tire associated with the vehicle; and
   a first device for continuously controlling tire pressure, the first device being controlled through the controller and comprising:
   a fixed non-rotating member fixedly attached to the vehicle, the fixed non-rotating member having at least one first seal surface, the at least one seal surface configured to be in fluid communication with a compressed air source; and
   a non-fixed rotating member rotatably attached to the fixed non-rotating member, the non-fixed rotating member being configured to rotate with the tire and having at least one second seal surface, wherein an air chamber defined within a volume between interacting the at least one first seal surface and the at least one second seal surface causes fluid communication between an interior space of the tire and the compressed air source,
   wherein the non-fixed rotating member comprises a plurality of apertures configured to facilitate mounting of the tire, and
   wherein a first subset of the plurality of apertures is configured to receive the tire lug bolts, and wherein a second subset of the plurality of apertures is configured to attach the tire to the non-fixed rotating member.

11. The system of claim 10, further comprising at least one bearing arranged between the fixed non-rotating member and the non-fixed rotating member, the bearing being configured to maintain alignment of the device.

12. The system of claim 10, wherein the fixed non-rotating member is configured to be fixedly mounted to a brake caliper or axle of the vehicle.

13. The system of claim 10, further comprising the compressed air source, and wherein the compressed air source includes an on-board compressor and an air treatment system.

14. The system of claim 10, further comprising a distribution valve manifold in fluid communication with the fixed non-rotating member and the compressed air source, the distribution valve manifold being further in electrical communication with the controller, the distribution valve manifold being configured to distribute air to the first device for continuously controlling tire pressure.

15. The system of claim 10, further comprising a wireless tire pressure monitor associated with the first tire, the wireless tire pressure monitor configured to send tire pressure data related to the first tire to the controller.

16. The system of claim 10, wherein the plurality of apertures numbers twice as many as tire lug bolts for a single tire.

17. The system of claim 16, wherein the first subset of the plurality of apertures is a first half of the plurality of apertures, and wherein the second subset of the plurality of apertures is a second half of the plurality of apertures.

18. The system of claim 10, further comprising three additional devices for continuously controlling tire pressure at three additional tires of the vehicle.

19. A device for continuously controlling tire pressure, the device comprising:
   a) a hub assembly comprising:
      i) a first outer member having:
         a first edge defining a first circumference of a first portion of the first member,
         a second recessed edge defining a second circumference of a second portion of the first member, and
         an air channel having a first opening disposed on a surface of the first edge and a second opening disposed on a surface of the second edge, the air channel extending between the first and second openings;
      ii) a second inner member having a first edge defining a first circumference of the second member, the second member being configured to couple to the first member, the coupled members being configured to attach to and rotate with a wheel of a vehicle; and
      iii) a central ring member having a first outer edge defining a first circumference, a second inner edge defining a second circumference, and an air channel having a first opening disposed on a surface of the first edge and a second opening disposed on a surface of the second edge, the air channel extending between the first and second openings, the ring member being configured to connect to a portion of the vehicle;
      wherein the coupled members are configured to be in communication with the ring member; and
   b) a compressed or pressurized air source capable of producing pressurized air effective to maintain tire pressure at a predetermined level.

* * * * *